US011592048B2

(12) United States Patent
Beck et al.

(10) Patent No.: US 11,592,048 B2
(45) Date of Patent: Feb. 28, 2023

(54) ANCHOR FOR ARRANGEMENT IN LIGHTWEIGHT BUILDING BOARDS, METHOD FOR FIXING, AND ASSEMBLY

(71) Applicant: Würth International AG, Chur (CH)

(72) Inventors: Daniel Beck, Wiesloch (DE); Thorsten Schulze Niehues, Künzelsau (DE)

(73) Assignee: Würth International AG, Chur (CH)

( * ) Notice: Subject to any disclaimer, the term of this patent is extended or adjusted under 35 U.S.C. 154(b) by 0 days.

(21) Appl. No.: 17/122,064

(22) Filed: Dec. 15, 2020

(65) Prior Publication Data

US 2021/0180633 A1 Jun. 17, 2021

(30) Foreign Application Priority Data

Dec. 16, 2019 (DE) ........................ 102019219753.1

(51) Int. Cl.

*F16B 39/02* (2006.01)
*F16B 19/00* (2006.01)
*F16B 5/08* (2006.01)
*F16B 5/01* (2006.01)

(52) U.S. Cl.

CPC ................ *F16B 19/00* (2013.01); *F16B 5/08* (2013.01); *F16B 5/01* (2013.01)

(58) Field of Classification Search

CPC ...... F16B 19/04; F16B 37/061; F16B 37/044; F16B 37/048; B23B 2305/34
USPC ........................................................... 411/82
See application file for complete search history.

(56) References Cited

U.S. PATENT DOCUMENTS 3,716,092 A * 2/1973 Serewicz .................. B64C 3/00 411/82.5
4,817,264 A * 4/1989 Worthing .......... B29C 66/72525 29/525.07
7,195,436 B1 * 3/2007 Stephen ................ F16B 11/006 411/376

(Continued)

FOREIGN PATENT DOCUMENTS

DE 102014214903 A1 2/2016
EP 2202050 A1 6/2010

(Continued)

OTHER PUBLICATIONS

European Search Report for EP App. 20210266.1 dated May 3, 2021.

*Primary Examiner* — Gary W Estremsky
(74) *Attorney, Agent, or Firm* — Boyle Fredrickson S.C.

(57) ABSTRACT

The invention relates to an anchor for arrangement in lightweight building boards, wherein a lightweight building board has a first covering layer and a second covering layer made from compact material that is stiff in compression, and a core layer, which is arranged between the covering layers and is made from material with a low density in comparison with the covering layers, in particular paper honeycomb, foam or solid wood of low density, having a first anchor part and a second anchor part, wherein the first and the second anchor part are designed to be movable relative to one another, in which a travel between a first end position and a second end position is limited, wherein the first end position is defined by means of first stop means on the first and the second anchor part, and the second end position is defined by means of second stop means on the first and the second anchor part.

18 Claims, 31 Drawing Sheets

(56) References Cited

U.S. PATENT DOCUMENTS

| | | | | |
|---|---|---|---|---|
| 8,528,299 | B2 * | 9/2013 | Cove | B29C 66/53465 52/745.21 |
| 11,231,058 | B2 * | 1/2022 | Mayer | B29C 65/08 |
| 2007/0102094 | A1 * | 5/2007 | de Groot | B29C 66/721 264/445 |
| 2015/0174818 | A1 | 6/2015 | Mayer et al. | |
| 2016/0001394 | A1 * | 1/2016 | Stumpf | B23K 20/12 228/114.5 |
| 2017/0080674 | A1 * | 3/2017 | Patel | B32B 3/266 |
| 2017/0284434 | A1 * | 10/2017 | Lopez | F16B 5/01 |
| 2018/0038399 | A1 * | 2/2018 | Fischer | F16B 37/042 |
| 2019/0358908 | A1 * | 11/2019 | Sankaran | B29C 65/602 |
| 2020/0208669 | A1 * | 7/2020 | Baumann | B29C 66/7254 |

FOREIGN PATENT DOCUMENTS

| | | | |
|---|---|---|---|
| EP | 3228879 | A1 | 10/2017 |
| WO | 2018135996 | A1 | 7/2018 |

* cited by examiner $c_1$ = Total anchor length
a = Latching nose length $= \frac{c+z}{2}$ )
z = Range of movement, means of retention during transportation ($z \geq 3 \times A_{OB1}$)

Ultrasonic sonotrode

$f_1$ = Frequency of ultrasonic sonotrode ($f_{UB1} < f_1 < f_{OB1}$)
$f_{B1}$ = Frequency band of ultrasonic sonotrode ($f_{UB1} < f_{OB1}$)
$f_{UB1}$ = Minimum frequency value
$f_{OB2}$ = Maximum frequency value
$F_1$ = Pressure force $A_1$ = Amplitude (simple peak value) of the ultrasonic sonotrode ($A_{UB1} < A_1 < A_{OB1}$)
$A_{B1}$ = Amplitude band of ultrasonic sonotrode ($A_{UB1} < A_{OB1}$)
$A_{UB1}$ = Minimum amplitude value
$A_{OB1}$ = Maximum amplitude value
vf = Feed

First anchor part

$f_2$ = Frequency of first anchor part ($f_{UB2} < f_2 < f_{OB2}$)
$f_{B2}$ = Frequency band of first anchor part ($f_{UB2} < f_{OB2}$)
$f_{UB2}$ = Minimum frequency value
$f_{OB2}$ = Maximum frequency value $A_2$ = Amplitude (simple peak value) of first anchor part ($A_{UB2} < A_2 < A_{OB2}$)
$A_{B2}$ = Amplitude band of first anchor part ($A_{UB2} < A_{OB2}$)
$A_{UB2}$ = Minimum amplitude value
$A_{OB2}$ = Maximum amplitude value

Second anchor part

$f_3$ = Frequency of second anchor part ($f_{UB3} < f_3 < f_{OB3}$ ; 0)
$f_{B3}$ = Frequency band of second anchor part ($f_{UB3} < f_{OB3}$ ; 0)
$f_{UB3}$ = Minimum frequency value
$f_{OB3}$ = Maximum frequency value
$F_2$ = Counter force $A_3$ = Amplitude (simple peak value) of second anchor part ($A_{UB3} < A_3 < A_{OB3}$ ; 0)
$A_{B3}$ = Amplitude band of second anchor part ($A_{UB3} < A_{OB3}$ ; 0)
$A_{UB3}$ = Minimum amplitude value
$A_{OB3}$ = Maximum amplitude value

Fig. 18

Position 2 (-) $A_1$ c = Total anchor length
a = Latching nose length
z = Range of movement, means of retention during transportation $z > 3 \times A_{OB1}$ $a = \frac{c + z}{2}$ Position 1 (+) $A_1$ c = Total anchor length
a = Latching nose length
z = Range of movement, means of retention during transportation $z > 3 \times A_{OB1}$ $a = \frac{c + z}{2}$ Part B

ANCHOR FOR ARRANGEMENT IN LIGHTWEIGHT BUILDING BOARDS, METHOD FOR FIXING, AND ASSEMBLY

FIELD OF THE INVENTION

The invention relates to an anchor for arrangement in lightweight building boards, wherein a lightweight building board has a first covering layer and a second covering layer made from compact material that is stiff in compression, and a core layer, which is arranged between the covering layers and is made from material with a low density in comparison with the covering layers, in particular paper honeycomb, foam or solid wood of low density, having a first anchor part and a second anchor part, wherein the first and the second anchor part are designed to be movable relative to one another. The invention also relates to a method for fixing at least one anchor and to an assembly having at least one anchor.

BACKGROUND

The invention is intended to improve an anchor for arrangement in lightweight building boards, a method for fixing an anchor and an assembly having at least one anchor.

SUMMARY

For this purpose, the invention provides an anchor having the features of Claim 1, a method having the features of Claim 16 and an assembly having the features of Claim 17. Advantageous developments of the invention will emerge from the dependent claims.

The invention provides an anchor for arrangement in lightweight building boards. A lightweight building board has a first covering layer and a second covering layer made from compact material that is stiff in compression, and a core layer, which is arranged between the covering layers and is made from material with a low density in comparison with the covering layers. As a core layer, it is possible, in particular, to use paper honeycomb, foam or solid wood of low density. Owing to the thin covering layers and the low density and low strength of the core layer, fastening anchors in lightweight building boards is problematic. However, if core layer materials of increased strength, e.g. lightweight solid woods such as balsa wood, for example, are combined and compressed with thin, pressure- and/or temperature-sensitive and/or nonporous covering layer materials to form a sandwich, it is possible to dispense with a connection between the anchor and the covering layers, in particular the covering layer situated opposite the direction of insertion, and it is possible to enter into a connection only with the core layer material and/or a boundary layer between core layers and covering layers. Precisely in the case of thin, pressure-sensitive, temperature-sensitive and/or nonporous covering layer materials, the introduction of an anchor, the fixing of which is brought about by introducing ultrasonic energy, can be accomplished more easily and, above all, in a reliable process since less care has to be taken of the sensitive covering layers.

The anchor according to the invention has a first anchor part and a second anchor part, wherein the first and the second anchor part are designed to be movable relative to one another. A travel of the two anchor parts relative to one another, between a first end position and a second end position, is limited. The first end position is defined by means of first stop means on the first anchor part and the second anchor part, and the second end position is defined by means of second stop means on the first anchor part and the second anchor part.

Limiting a travel between a first end position and a second end position provides a means of securing the anchor during transportation. Thus, the two anchor parts can move relative to one another, which is indispensable when introducing ultrasonic energy in order, on the one hand, to bring about heating, plasticization and/or liquefaction of the anchor material at the contact points between the two anchor parts and at the contact points of the anchor parts with the lightweight building board by a movement of the two anchor parts relative to one another. On the other hand, the two anchor parts cannot come apart, thereby providing a means of retention during transportation. Here, a selected travel between the first end position and the second end position is just enough to make available sufficient travel to convert the ultrasonic vibrations efficiently into frictional energy during the application of ultrasound.

As a development of the invention, the first end position and the second end position define a travel of between 100 micrometres and 1000 micrometres, in particular between 150 micrometres and 240 micrometres.

It is advantageous if the selected travel is just enough to ensure that the travel is sufficient to convert introduced ultrasonic energy efficiently into frictional heat, even taking into account tolerances of the anchor parts. At the same time, however, the choice of an unnecessarily large travel is avoided in order to provide a compact anchor that avoids installation errors by virtue of its short travel. The two anchor parts are movable relative to one another. Making the selected travel as short as possible reduces the risk that the two anchor parts will not move relative to one another in the intended manner during fixing, e.g. will be moved obliquely relative to one another or the like. Such a risk exists precisely in the case of lightweight building boards with core layer materials of very low density. A movement path of between 150 μm and about 300 μm, in particular 240 μm, has proven particularly advantageous in respect of efficient introduction of ultrasonic energy.

As a development of the invention, the first end position and the second end position define a travel which is between twice and four times the amplitude of an ultrasonic sonotrode, in particular three times the amplitude of the sonotrode, wherein the sonotrode is used to apply ultrasound to the anchor.

Application of the ultrasound by means of the sonotrode requires movability of the two anchor parts relative to one another in order to convert frictional energy into heat between the anchor parts and between the anchor parts and the lightweight building board. In order to convert the ultrasonic energy as efficiently as possible into frictional heat, the anchor part which is in contact with the sonotrode or into which the ultrasonic energy is introduced first should be able to follow the vibration of the sonotrode, at least at the start of application of the ultrasound. Consequently, the travel between the two end positions should amount to at least twice the amplitude of the sonotrode vibration. Tests have shown that a travel which corresponds to three times the amplitude of the sonotrode is particularly advantageous and allows very efficient conversion of the ultrasonic energy into frictional heat.

As a development of the invention, the first anchor part and the second anchor part each have at least two fingers extending parallel to a longitudinal direction of the anchor, wherein the fingers of the first anchor part and the fingers of the second anchor part engage at least partially in one another in the assembled state of the first and the second anchor part, wherein the first stop means, which define the first end position, are embodied by means of at least one of the fingers of one of the anchor parts, which rests by its free end against an opposite element of the respective other anchor part.

In this way, the first end position is defined by means of elements of the two anchor parts, which are then moved relative to one another, heated and then plasticized or liquefied when the ultrasonic energy is introduced.

As a development of the invention, the second stop means, which define the second end position, are embodied by means of latching elements on the two anchor parts.

As a result, the two anchor parts, which can be produced separately for example, can be inserted into one another until the latching elements of the second stop means engage in one another. The two anchor parts are then secured on one another in a loss-proof manner, and movability of the two anchor parts relative to one another is nevertheless ensured.

As a development of the invention, the latching elements have projecting latching noses which project at least partially radially inwards, in the direction of a central longitudinal axis of the anchor part.

By means of latching noses that project radially inwards, it is possible to define reliably acting stop means, which can furthermore be designed in such a way that an injection mould for the anchor parts can be designed without undercuts.

As a development of the invention, each latching nose is arranged on a latching arm extending substantially parallel to the central longitudinal axis of the anchor part.

By means of a latching arm, it is possible to achieve a spring movement of the latching nose in a very simple manner.

As a development of the invention, the latching noses have a rounded shape in a direction parallel to the central longitudinal axis of the anchor part.

As a result, the latching noses of two identical anchor parts can slide past one another until a latched position has been reached. By means of the rounded shape of the latching noses, it is possible to form run-on bevels. As a result, the latching noses are deflected as the anchor parts are inserted into one another. Although it is advantageous that the two anchor parts are of identical design to one another, it is quite possible within the scope of the invention for the first anchor part and the second anchor part to be completely different from one another.

As a development of the invention, the latching noses each have at least one run-on bevel when viewed in a direction perpendicular to the central longitudinal axis.

As the two anchor parts are inserted into one another, the latching noses are deflected through the action of the run-on bevels sliding past one another until a latched position is reached, and the latching noses then spring back.

As a development of the invention, at least two latching noses jointly form a section of a screw channel in the anchor.

As a result, the latching noses have a dual function, namely, on the one hand, to define the second end position of the two anchor parts relative to one another and then, in addition, to provide at least sections of a screw channel. As a result, the anchor according to the invention can be produced with a low outlay of material.

As a development of the invention, two to six latching noses, in particular four latching noses, are provided on each anchor part.

By means of a larger number of latching noses, it is possible, on the one hand, to achieve a reliable latching effect and hence reliable definition of the second end position, and since the latching noses advantageously define a section of a screw channel at the same time, reliable retention of a screw in the screw channel can be ensured.

As a development of the invention, the first anchor part and the second anchor part each have at least two latching arms which extend substantially parallel to or with a principal component parallel to the central longitudinal axis of the anchor and at the end of each of which a latching nose extending perpendicularly to the central longitudinal axis is arranged.

As a result, the latching nose projects radially inwards relative to the latching arm. As two anchor parts are inserted into one another, the latching nose is thereby first of all deflected until it has reached the latching position, e.g. through the action of one or more run-on bevels, and then snaps back into the latched position. Here, a spring preload is achieved principally by bending of the latching arm.

As a development of the invention, when the two anchor parts are between the two end positions relative to one another, in each case one latching nose of the first anchor part is arranged between two latching noses of the second anchor part, when viewed in a projection parallel to the central longitudinal axis. The latching noses of the first and of the second anchor part can be of identical design but, within the scope of the invention, they may also be of different designs.

A latching effect is thereby achieved by way of latching surfaces in the region of the lateral boundaries of the latching noses. This makes it possible to use two identical anchor parts. A retaining force of the latching noses engaging on one another is sufficiently high, even in the case of a small area of the lateral boundaries, since, of course, only the travel of the two anchor parts relative to one another has to be limited to achieve a means of retention during transportation.

As a development of the invention, in the assembled state of the anchor parts and when the two anchor parts occupy the second end position relative to one another, the latching noses of the first anchor part and the latching noses of the second anchor part rest against one another only in the region of latching surfaces which adjoin the lateral boundaries of the latching noses.

As a development of the invention, the two anchor parts are of identical design to one another.

In this way, one and the same injection mould can be used for the production of both anchor parts. As a result, low-cost production is possible. This is also because just one anchor part has to be held in stock for the anchor. Injection moulds for the two anchor parts can be designed in such a way that they do not have any undercuts and, as a consequence, manage without expensive slides or the like.

The problem underlying the invention is also solved by a method for fixing at least one anchor according to the invention, in which the following steps are provided: introducing a hole into a lightweight building board, in particular a blind hole, introducing the anchor into the blind hole in the assembled state, wherein the anchor parts can move relative to one another between the first end position and the second end position in the assembled state, applying ultrasonic energy to the anchor, with the result that the material of the anchor is heated and converted to a pasty or flowable state, at least in the regions in which the anchor rests against the inner wall of the hole in the region of the first covering layer, of the second covering layer and/or in the region of the core layer, penetrates into at least one of the covering layers and/or the core layer, and cools down after the ultrasonic energy is switched off, with the result that the anchor is fixed by material bonding and/or positively, i.e. by positive fit, in the lightweight building board.

The problem underlying the invention is also solved by an assembly having at least one anchor according to the invention in a lightweight building board.

The anchor according to the invention can be designed in such a way that, in the state in which it is fixed in the lightweight building board, it engages behind the upper covering layer and/or the lower covering layer and, as a result, is secured positively, i.e. by positive fit, between the two covering layers. Alternatively or in addition, it is also possible for the anchor to be connected positively and/or by material bonding to the core layer of the lightweight building board. As a result, the assembly according to the invention can be implemented in a reliable process since, in the case of pressure-sensitive and/or temperature-sensitive covering layers of the lightweight building board, there is no need to fear that the lower covering layer will have pressure points or defects due to excessive heating. Nevertheless, the anchor according to the invention is reliably fixed in the lightweight building board and can provide high withdrawal forces for a screw which is screwed into the anchor.

Further features and advantages of the invention will become apparent from the claims and the following description in conjunction with the drawings. In this context, individual features of the various embodiments described and illustrated can be combined in any desired manner without exceeding the scope of the invention. This also applies to the combination of individual features without other individual features together with which they have been illustrated and/or described.

BRIEF DESCRIPTION OF THE DRAWINGS

In the drawings:

FIG. 18 shows terminological explanations and definitions for the following figures, FIG. 39 shows another sectional view of the anchor of FIG. 35, wherein the section plane is different from that in FIG. 37.

DETAILED DESCRIPTION

Figure 1:
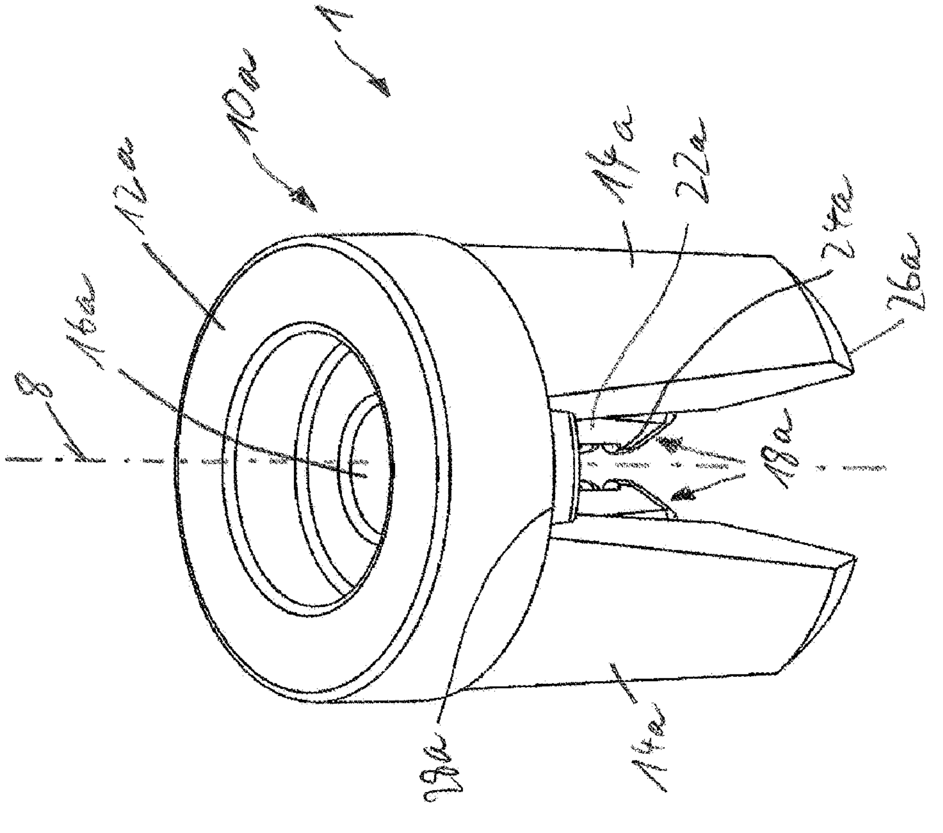
FIG. 1 shows an isometric illustration of a first anchor part of an anchor according to the invention obliquely from above.

FIG. 1 shows a view of a first anchor part 10*a* of an anchor 1 according to the invention obliquely from above. The anchor according to the invention can be constructed from two identical anchor parts 10. For this purpose, the first anchor part 10*a* can be rotated through 180 into the position illustrated in FIG. 2 and, for the sake of clarity, is referred to as the second anchor part 106 in FIG. 2. The first anchor part 10*a* and the second anchor part 106 are then placed one on top of the other, giving the position illustrated in FIG. 7, in which the anchor parts 10*a*, 10*b* have been fitted together to a certain extent but have not yet been connected to one another in a loss-proof manner. Starting from the position in FIG. 7, the two anchor parts 10*a*, 10*b* are then moved towards one another as per FIG. 11 until latching elements present on the two anchor parts 10*a*, 10*b* latch into one another, and the fully assembled state illustrated in FIGS. 11 to 17, in which the two anchor parts 10*a*, 10*b* are connected to one another in a loss-proof manner to implement a means of retention for transportation, is achieved. In the fully assembled state in FIGS. 12 to 17, the two anchor parts 10*a*, 10*b* can nevertheless be moved relative to one another, wherein a travel between a first end position and a second end position is limited, as will be explained below.

FIG. 1 shows that the first anchor part 10 has an annular base 12*a*, from the underside of which a total of four fingers 14*a* extend. The annular base 12*a* forms a first section of a screw channel 16*a*, which will be explained below.

Between two fingers 14*a* of the first anchor part 10, it is possible to see latching elements 18*a*, which each have a latching arm 22*a* and a latching nose 24*a*. The latching arms 22*a* extend approximately parallel to a central longitudinal axis of the first anchor part 10. The latching noses 24*a*, which are arranged on the free end of the latching arms 22*a*, extend substantially in the direction of a central longitudinal axis 8 of the anchor part 10.

Figure 2:
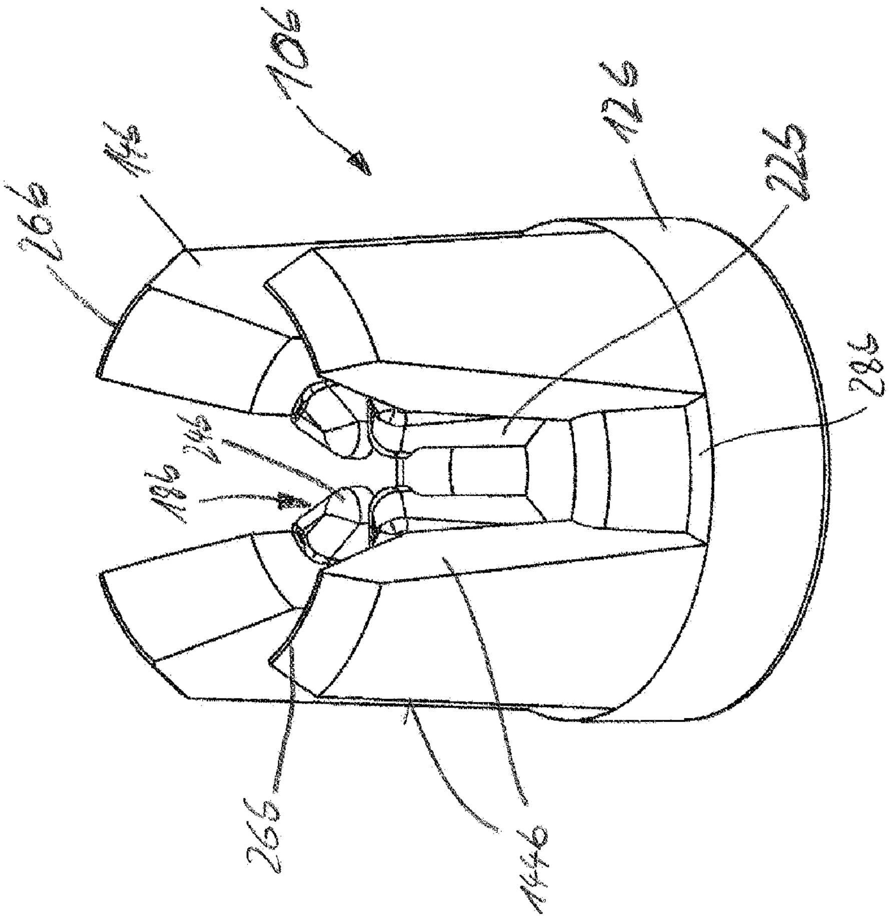
FIG. 2 shows the anchor part of FIG. 1 in a position rotated through 180, wherein the anchor part of FIG. 1 and FIG. 2 can be used either as a first or as a second anchor part of the anchor according to the invention.

As has already been explained, the second anchor part 10*b* in FIG. 2 is of identical design to the first anchor part 10*a*. The identical elements of the second anchor part 10*b* are denoted by the same numerals but with the letter b as a suffix. The fingers 14*a*, 14*b* are of roof-like design in cross section at their free ends. In the assembled state, the free end 26*a*, 26*b* of the fingers can as a result rest against a stop surface 28*a*, 28*b* of the base part 12*a*, 12*b*. When ultrasonic energy is applied to the two anchor parts 10*a*, 10*b*, the free ends 26*a*, 26*b* of the two anchor parts 10*a*, 10*b* are consequently heated, plasticized and/or liquefied and, as a result, can ensure a materially bonded connection of the two anchor parts 10*a*, 10*b* to one another and a materially bonded and/or positive connection of the anchor 1 to a core layer material of a lightweight building board since the liquefied material penetrates into the core layer. Moreover, the liquefied material can form an undercut with the covering layers of the lightweight building board and thereby ensure positive anchoring of the anchor 1 in the lightweight building board. Both anchor parts 10*a*, 10*b* are composed entirely of thermoplastic material, e.g. thermoplastic plastic. It is possible within the scope of the invention to form only parts of the anchor parts 10*a*, 10*b* from thermoplastic material, e.g. only the free ends 26*a*, 26*b* of the fingers 14*a*, 14*b* and the stop surfaces 28*a*, 28*b*.

The lateral surfaces 144*b* of the fingers 14*b* taper towards the free end 26*b*, with the result that a cross section of the fingers 14*b* perpendicularly to the central longitudinal axis 8 decreases in the direction of the free end 26*b*.

Figure 3:
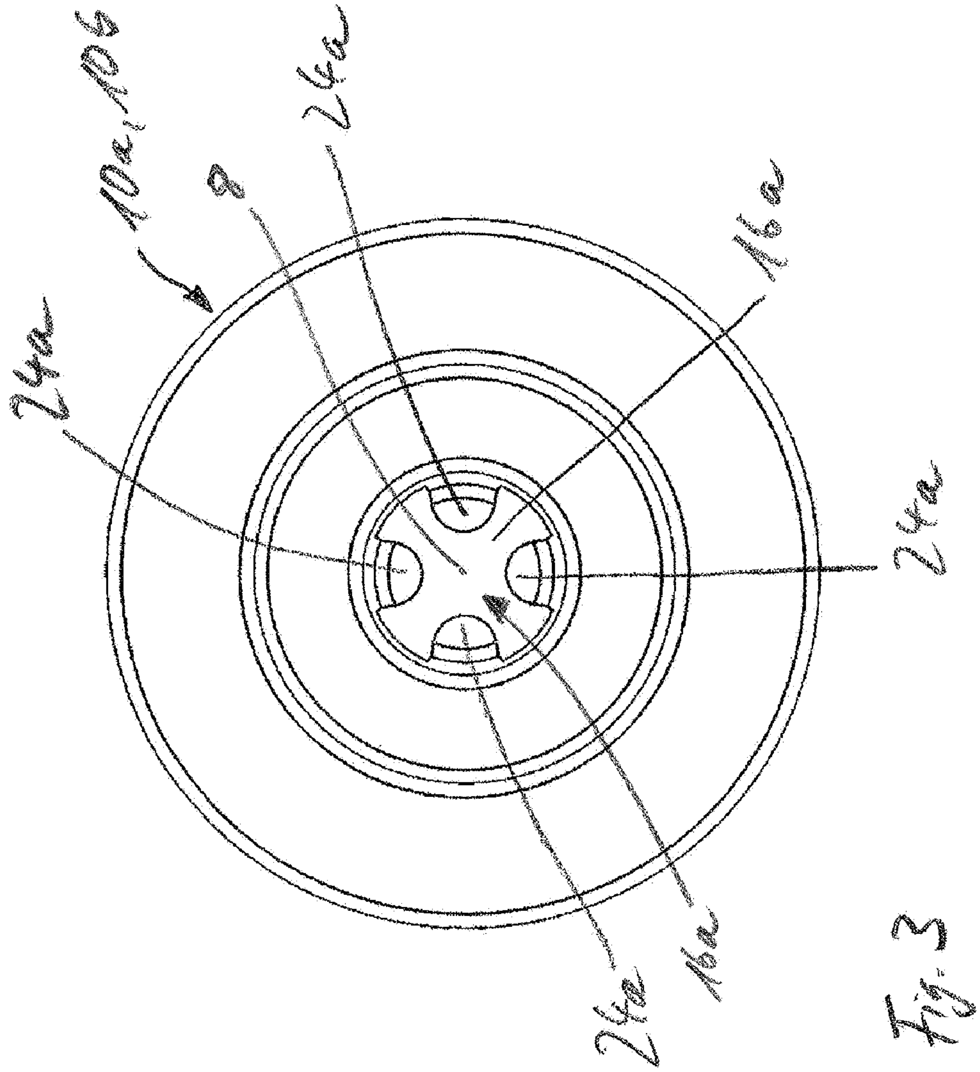
FIG. 3 shows the anchor part of FIG. 2 from below.

FIG. 3 shows the anchor part 10*a*, 10*b* in a view from above. In FIG. 3, the view enters the anchor part 10*a*, 10*b* from above. In this view, it can be seen that four latching noses 24*a*, which project in the direction of the central longitudinal axis 8, are provided. The latching noses 24*a* can thereby form sections of the screw channel 16*a*.

Figure 4:
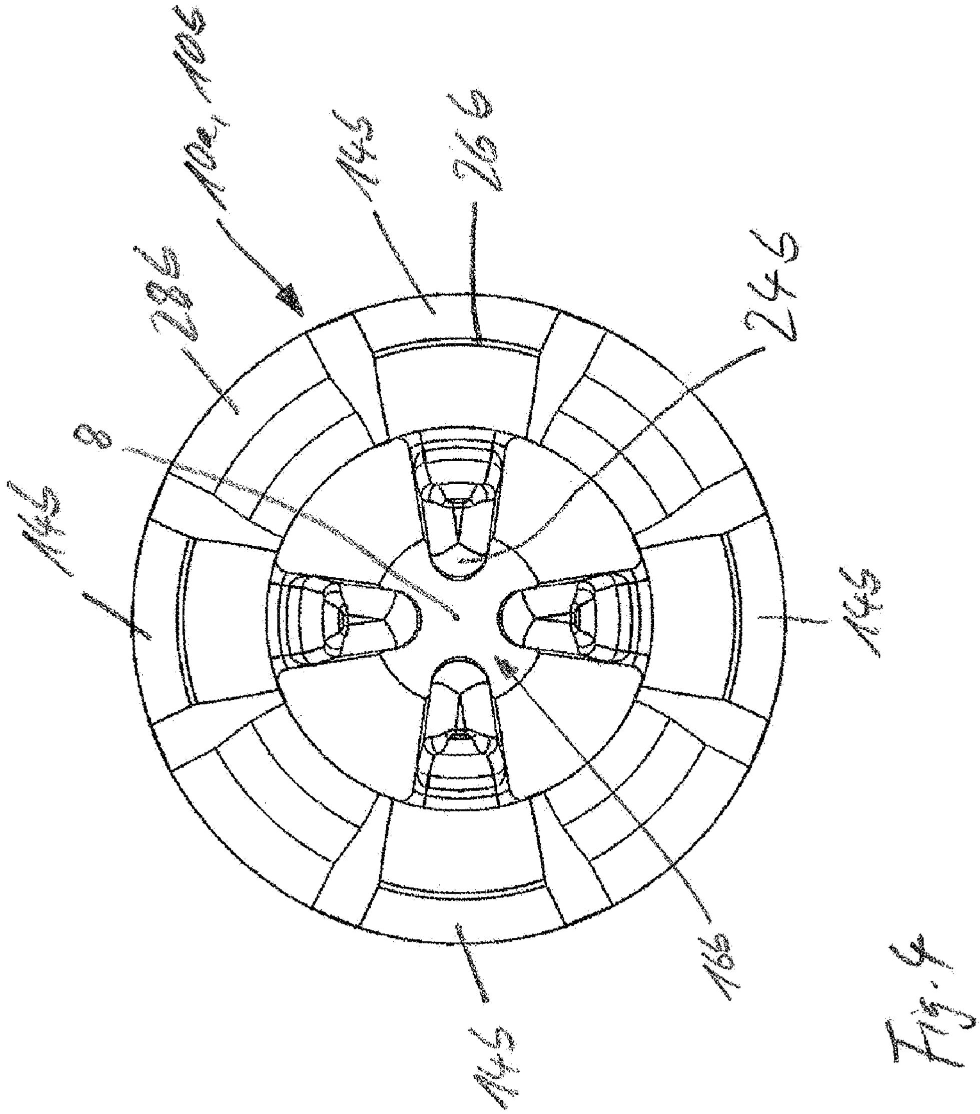
FIG. 4 shows the anchor part of FIG. 2 from above.

FIG. 4 shows a view of the anchor part 10*a* of FIG. 1 from below, or a view of the anchor part 10*b* of FIG. 2 from above. The total of four fingers 14*b* and the free ends 26*b* thereof can be seen. The free ends 26*b* are not formed by a sharp edge but by a slightly flattened edge. As a result, there is a somewhat larger contact surface available when ultrasonic energy is introduced than if a sharp edge had been formed, and therefore heating of the free ends 26*b* due to movement relative to the contact surfaces 28*a* takes place more rapidly than with the provision of a sharp edge.

It can likewise be seen in the view in FIG. 4 that the latching noses 24*b* project in the direction of the central longitudinal axis 8 of the anchor part and thereby form a section of the screw channel 16*b*.

Figure 5:
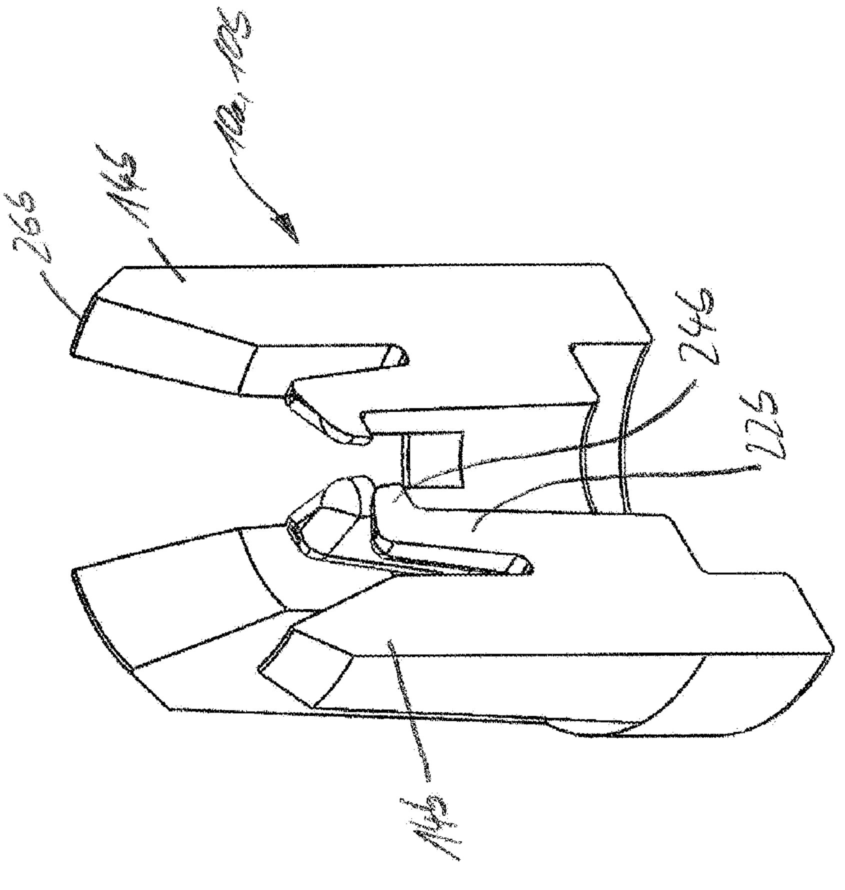
FIG. 5 shows a view of the sectioned anchor part of FIG. 2 obliquely from above.

FIG. 5 shows a sectional view of the anchor part 10*a*, 10*b*, wherein the section plane passes through two fingers 14*b*. It is clearly apparent in this view that the latching arms 22*b* extend substantially parallel to the fingers 14*b* and hence substantially parallel to the central longitudinal axis 8. The latching noses 24*b*, which project in the direction of the central longitudinal axis, are then arranged on the free ends of the latching arms 22*b*. It can be seen in the view in FIG. 5 that the anchor parts 10*a*, 10*b* can be produced as an injection moulded part in a mould without undercuts. A first half of the mould would then extend from below as far as the underside of the latching noses 24*b*, and a second part of the mould would then be placed on top. After the separation of the two mould parts, the finished anchor part 10*a*, 10*b* can be removed. The injection mould does not require any slides or the like and, as a result, can be produced at low cost. The roof-like cross section or tapering cross section of the fingers 14*b* can also be seen in FIG. 5.

Figure 6:
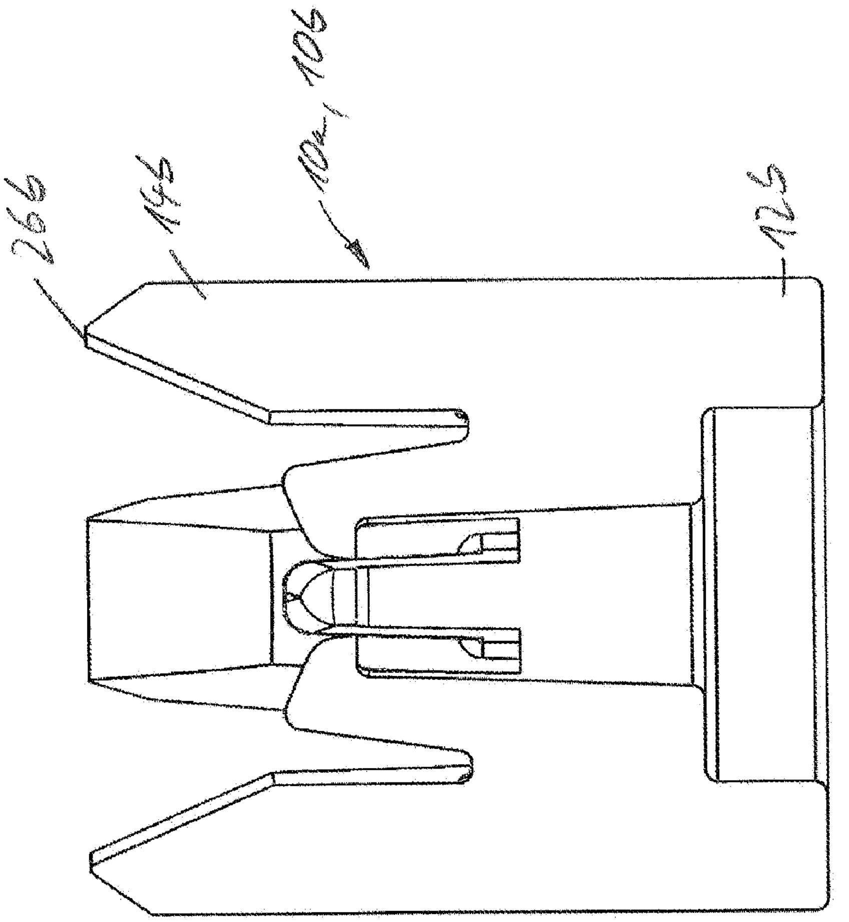
FIG. 6 shows the sectioned anchor part of FIG. 5 in a side view.

FIG. 6 shows the sectioned anchor part 10*a*, 10*b* of FIG. 5 from the side.

Clearly visible in this view is the roof-like shape, in cross section, of the free ends of the fingers 14*b*, which ends in the slightly flattened end 26*b*.

Figure 7:
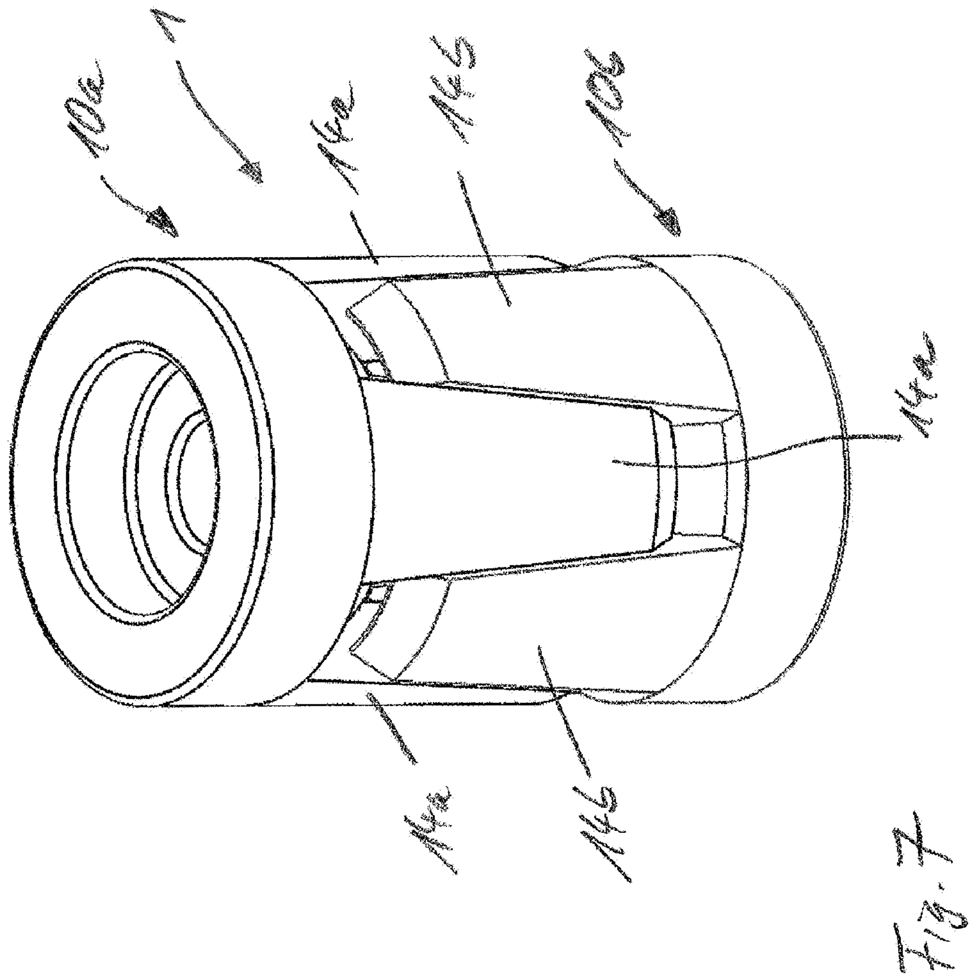
FIG. 7 shows an anchor according to the invention obliquely from above, wherein the anchor part of FIG. 1 and the anchor part of FIG. 2 have been fitted together to a certain extent.

FIG. 7 shows the two anchor parts 10*a*, 10*b* in a state in which the anchor parts have been placed one on top of the other, with the result that a section of the fingers 14*a* of the first anchor part 10*a* is arranged between the fingers 14*b* of the second anchor part 10*b* and vice versa. In the state illustrated in FIG. 7, the two anchor parts 10*a*, 10*b* have been inserted into one another only to a certain extent and not yet completely. Starting from the state in FIG. 7, the two anchor parts 10*a*, 10*b* can still be separated from one another without problems, thus for example by pulling off upwards the anchor part 10*a* which is at the top in FIG. 7.

Figure 8:
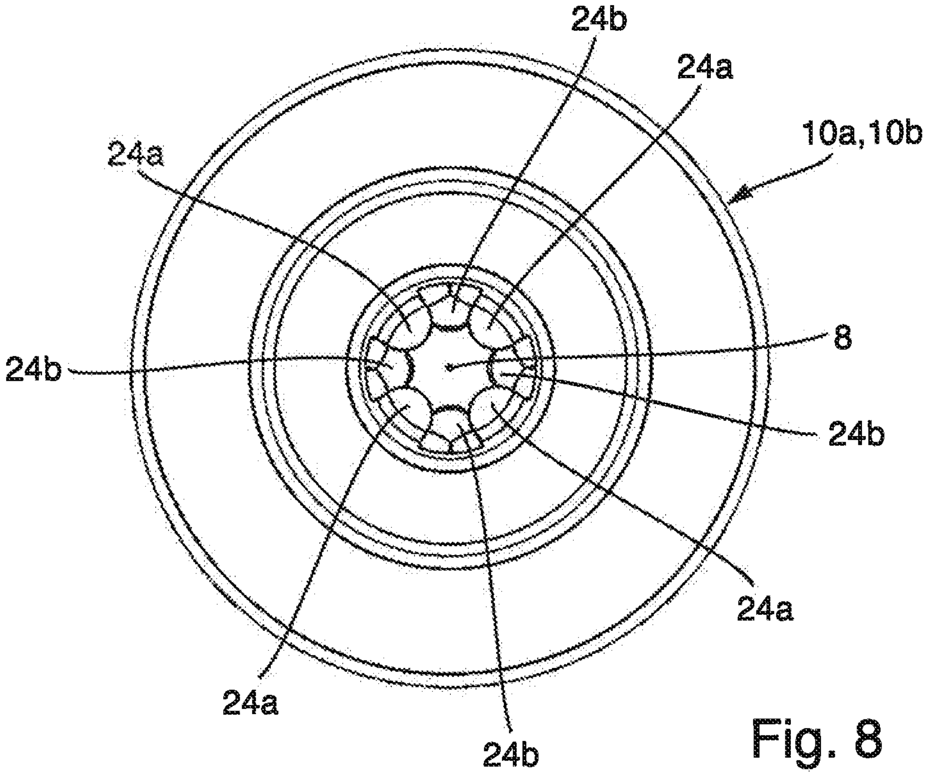
FIG. 8 shows the anchor of FIG. 7 from above.

The illustration in FIG. 8 shows the two anchor parts 10*a*, 10*b* of FIG. 7 in a view from above. Of the anchor part 10*b* which is at the bottom in FIG. 7 only the latching noses 24*b* can be seen, these being arranged between in each case two latching noses 24*a* of the first anchor part 10*a* in the projection of FIG. 8 parallel to the central longitudinal axis. In the view in FIG. 8, the latching noses 24*b* of the second anchor part 10*b* are partially concealed, namely in the region of the lateral edge boundaries thereof, by the latching noses 24*a* of the first anchor part 10*a*. The latching noses 24*a* are thus still arranged above the latching noses 24*b*, see also FIG. 9.

Figure 9:
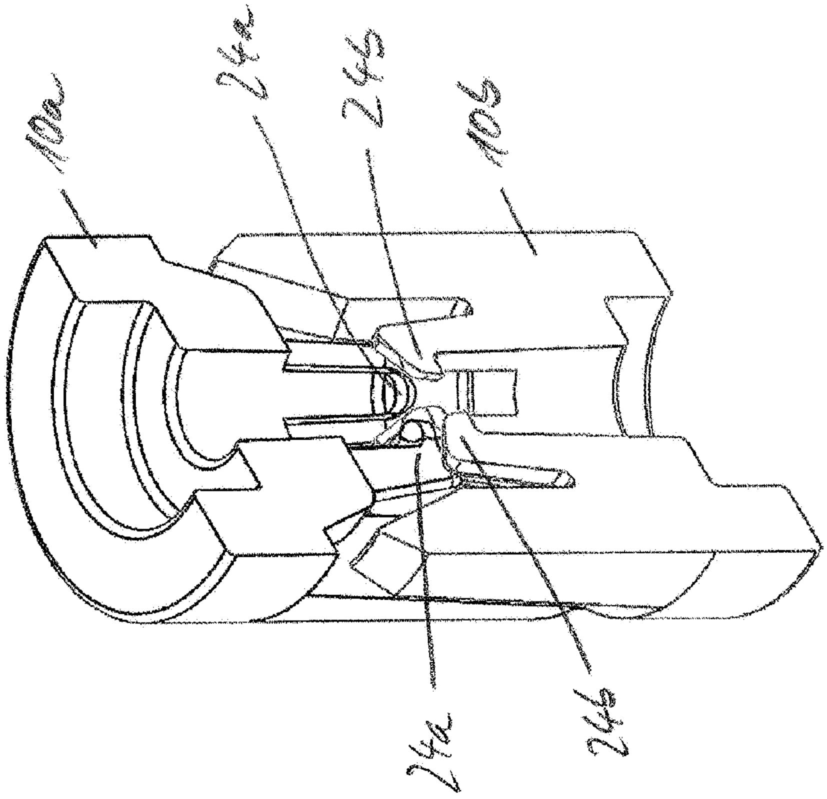
FIG. 9 shows a view obliquely from above of the sectioned anchor of FIG. 7.

FIG. 9 shows the anchor parts 10*a*, 10*b* in the position in FIGS. 7 and 8 in the sectioned state. It can be seen that the latching noses 24*a* of the first anchor part 10*a*, which is at the top in FIG. 9, rest laterally on the latching noses 24*b* of the anchor part 10*b* which is at the bottom in FIG. 9. As a result, the lower latching noses 24*b* are concealed in the region of the lateral boundaries thereof by the latching noses 24*a* of the upper, first anchor part 10*a* in the projection in FIG. 8.

Figure 10:
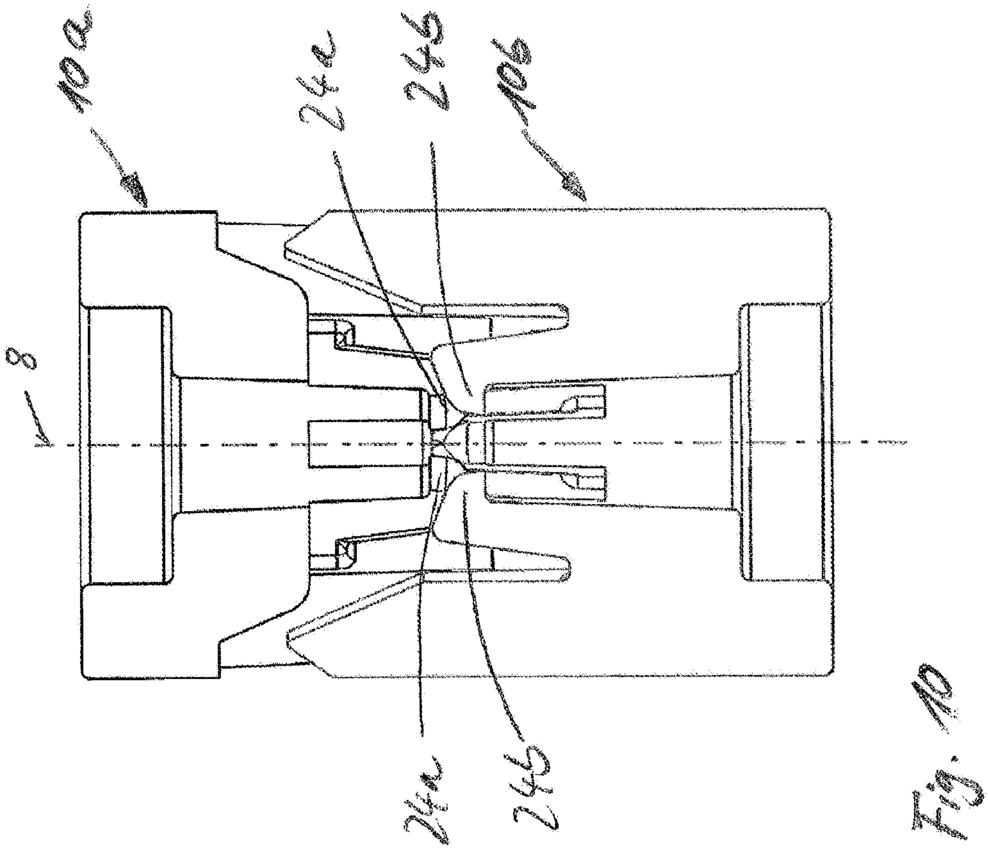
FIG. 10 shows a side view of the sectioned anchor of FIG. 9.

FIG. 10 shows the sectioned anchor parts 10*a*, 10*b* of FIG. 9 in a side view. Here too, it can be seen that a section of the latching noses 24*a* of the first anchor part 10*a*, which is at the top in FIG. 10, are still arranged above the latching noses 24*b* and rest laterally against the latching noses 24*b* of the second anchor part 10*b*, which is at the bottom in FIG. 10.

Figure 11:
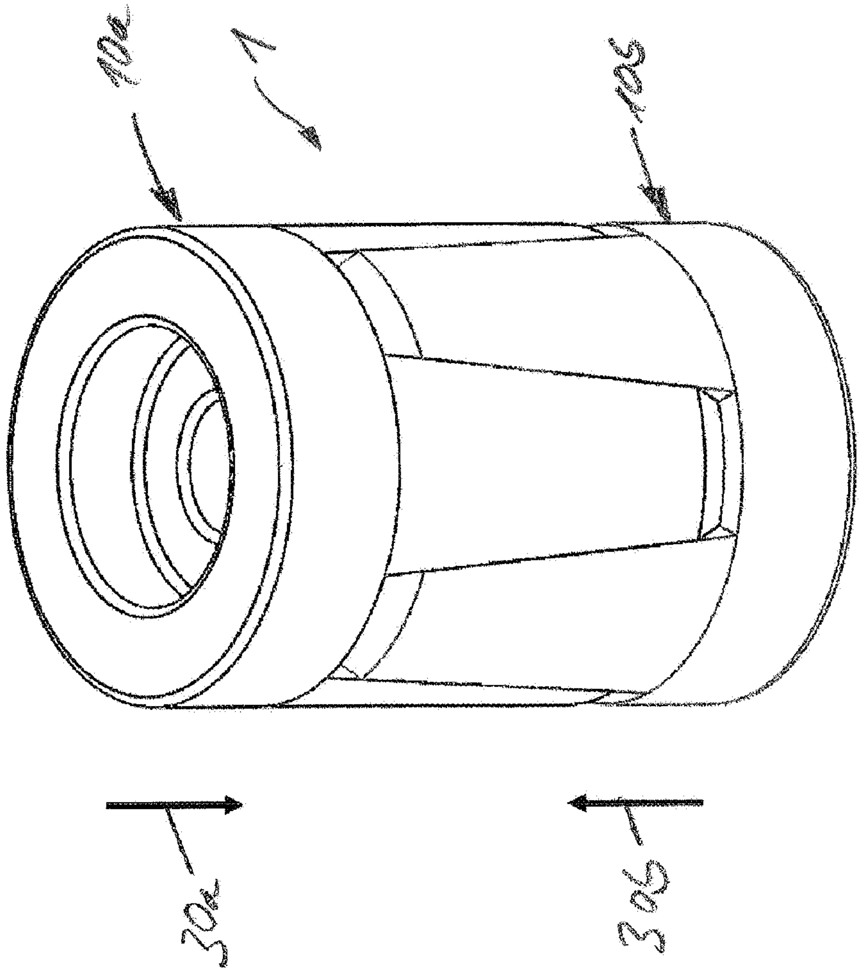
FIG. 11 shows the illustration of the anchor of FIG. 7 in the fully assembled and latched state.

If a force is exerted on the two anchor parts 10*a*, 10*b*, starting from the state in FIGS. 7 to 10, see FIG. 11, with the result that the two anchor parts 10*a*, 10*b* are moved towards one another in accordance with the arrows 30*a*, 30*b*, the latching noses 24*a* of the anchor part 10*a* which is at the top in FIG. 11 are pressed through between the latching noses 24*b* of the anchor part 10*b* which is at the bottom in FIG. 11. For this purpose, the latching noses 24*a* and/or the latching noses 24*b* must yield radially outwards to a certain extent. This is made possible by the spring action of the latching arms 22*a*, 22*b*. As soon as the latching noses 24*a* of the anchor part 10*a* which is at the top in FIG. 11 have been pushed past the latching noses 24*b* of the lower anchor part 10*b*, the latching arms 22*a*, 22*b* spring back, and the latching noses 24*a*, 24*b* latch into one another by means of their respective latching surfaces, see also FIG. 15. If an attempt is now made to pull the two anchor parts 10*a*, 10*b* apart again, starting from this state in which they are inserted completely into one another, this is prevented by the latching noses 24*a*, 24*b*, which are then resting against one another by their latching surfaces.

Figure 12:
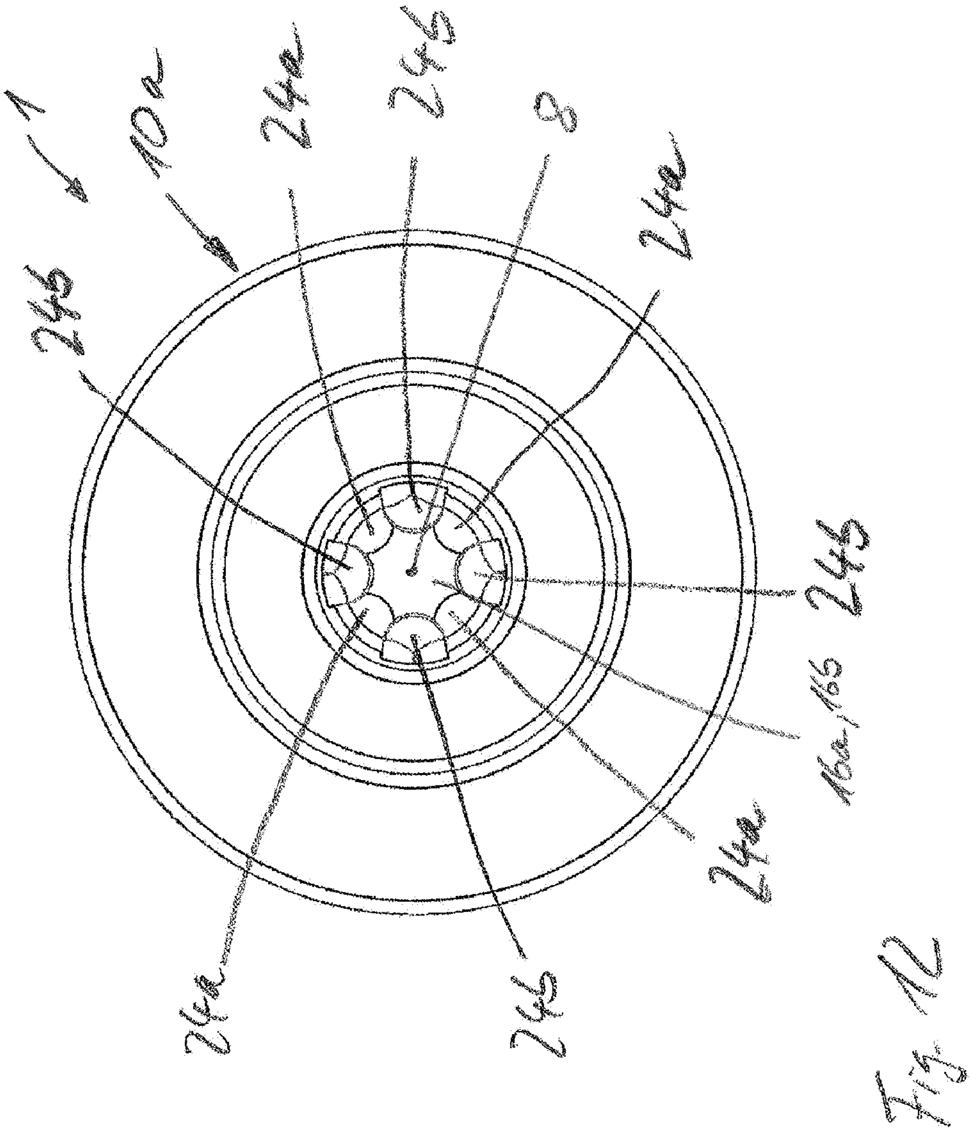
FIG. 12 shows the anchor of FIG. 11 from above.

This can be seen in the illustration in FIG. 12. In FIG. 12, the view is of the first anchor part 10*a* from above parallel to the central longitudinal axis 8. The latching noses 24*a* of the first anchor part 10*a* are now arranged below the latching noses 24*b* of the second anchor part and are therefore partially concealed. As can be seen in the projection in FIG. 12, the latching noses 24*a*, 24*b* overlap in the region of the lateral boundaries thereof. This prevents the two anchor parts 10*a*, 10*b* from being pulled apart again.

Figure 13:
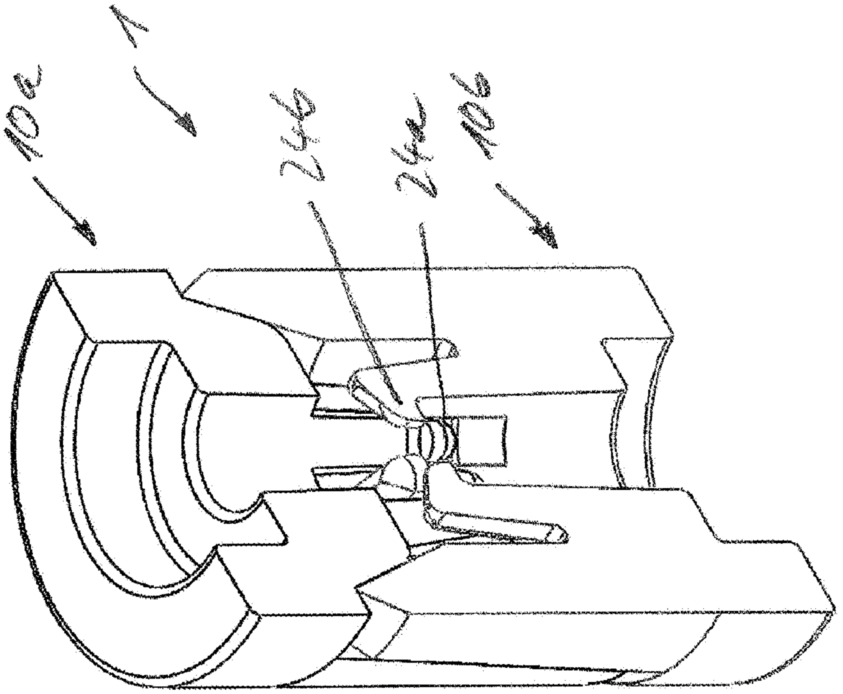
FIG. 13 shows the anchor of FIG. 11 in a sectional view obliquely from above.

FIG. 13 shows the two anchor parts 10*a*, 10*b* in the state in FIG. 11 in a sectional view. It can be seen that the latching noses 24*b* of the second anchor part 10*b* are arranged above the latching noses 24*a* of the first anchor part 10*a*. If the anchor part 10*a* is pulled upwards, starting from the state in FIG. 13, this continues only until the latching surfaces of the latching noses 24*a*, said surfaces being at the top in FIG. 13, strike against the latching surfaces of the latching noses 24*b*, the latter surfaces being at the bottom in FIG. 13.

Figure 14:
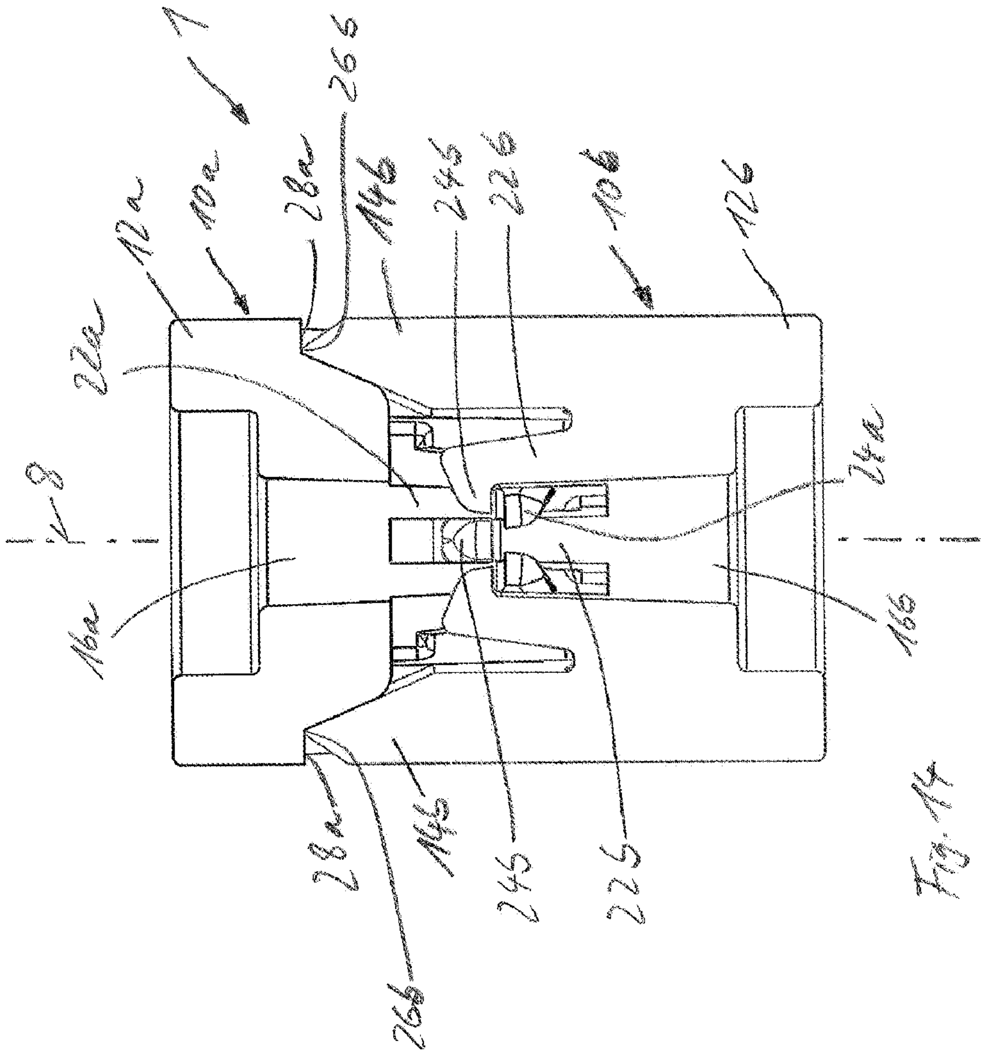
FIG. 14 shows the sectional view in FIG. 13 in a side view.

FIG. 14 shows the sectional view in FIG. 13 from the side. In this illustration, the two anchor parts 10*a*, 10*b* occupy the first end position. In this first end position, the free ends 26*b* of the fingers 14*b* of the second anchor part 10*b* rest against the stop surfaces 28*a* on that side of the base part 12*a* of the first anchor part 10*a* which is at the bottom in FIG. 14. The free ends 26*b* of the fingers 14*b* of the second anchor part 10*b* and the contact surfaces 28*a* of the first anchor part 10*a* thus form a part of the first stop means, which define the first end position of the two anchor parts 10*a*, 10*b* relative to one another. It is not possible to see in FIG. 14 that, in the same way, the free ends 26*a* of the fingers 14*a* of the first anchor part 10*a* are resting against the stop surfaces 28*b* on that end of the base part 12*b* of the second anchor part 10*b* which is at the top in FIG. 14. The free ends of the fingers 14*a* of the first anchor part 10*a* and the stop surfaces 28*b* of the second anchor part 10*b* thus also form a further part of the first stop means for the definition of the first end position.

Within the scope of the invention, the two anchor parts 10*a*, 10*b* do not necessarily have to be of identical design to one another. For example, the stop surfaces 28*b* on the second anchor part 10*b* could be omitted, and thus only the free ends of the fingers 14*b* of the second anchor part 10*b* and the stop surfaces 28*a* of the first anchor part 10*a* would define the first stop means, cf. FIGS. 40 and 41.

It can already be seen in FIG. 14 that the latching surfaces of the latching noses 24*b* and of the latching noses 24*a*, said latching surfaces being arranged perpendicularly to the central longitudinal axis 8, are situated partially opposite one another, namely when viewed in a direction of view parallel to the central longitudinal axis 8. Starting from the state in FIG. 14, the two anchor parts 10*a*, 10*b* can be pulled apart to a certain extent, corresponding to the clearance visible in FIG. 14 between the upper latching surfaces of the latching noses 24*a* and the lower latching surfaces of the latching noses 24*b*.

Figure 15:
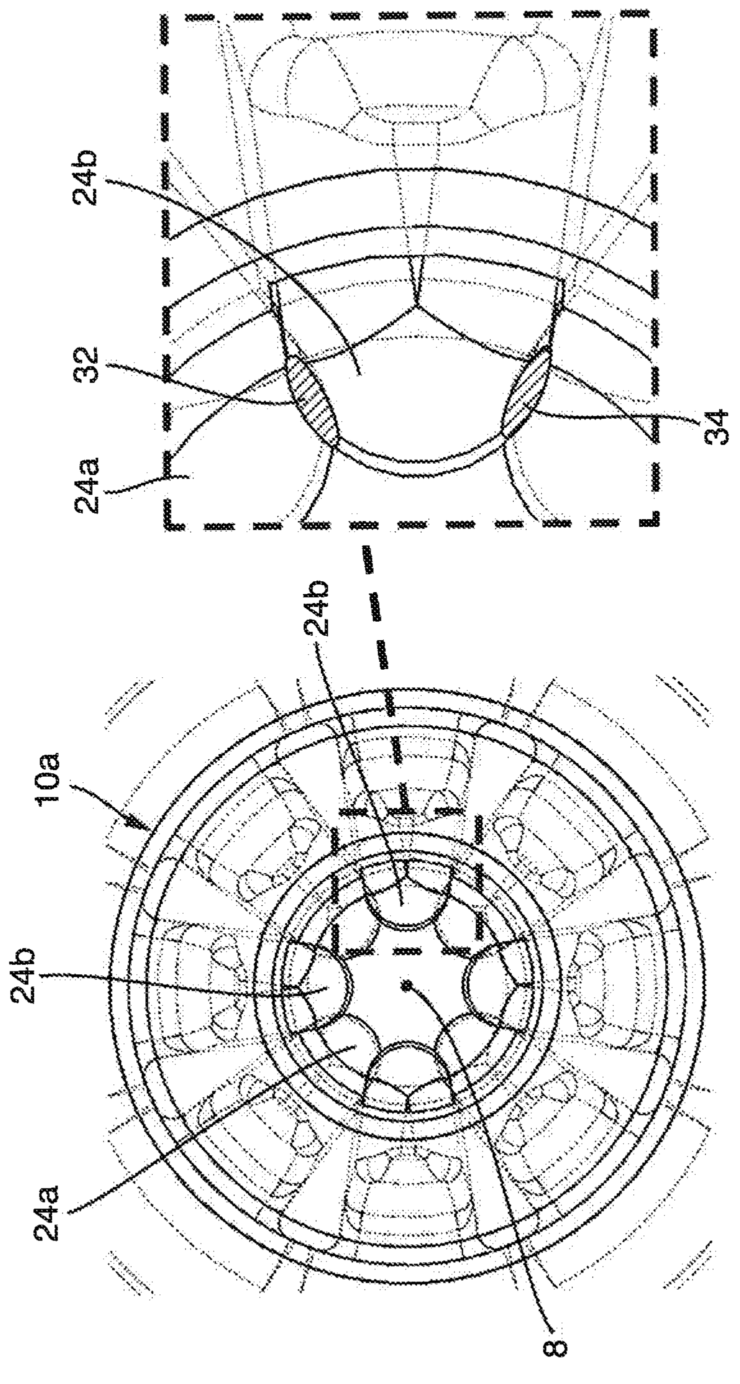
FIG. 15 shows an enlarged view of the illustration in FIG. 12 and a detail enlargement thereof.

FIG. 15 shows an illustration of the anchor of FIG. 14 from above. Thus, the view of the anchor part 10*a* is from above and the direction of view is parallel to the central longitudinal axis 8. In this view, the latching noses 24*b* partially conceal the latching noses 24*a*. This is evident from the detail enlargement arranged on the right in FIG. 15. In the projection in FIG. 15, the latching surface of the latching nose 24*b* of the second anchor part 10*b* overlaps sections of the latching surface of the latching nose 24*a* of the first anchor part 10*a* in the edge regions of the latter. These overlapping areas 32, 34 are illustrated with grey shading on the right in the detail enlargement in FIG. 15. The overlapping areas 32, 34 are used as a means to prevent the anchor parts 10*a*, 10*b* from being pulled apart, thus providing a means of retention during transportation.

Figure 16:
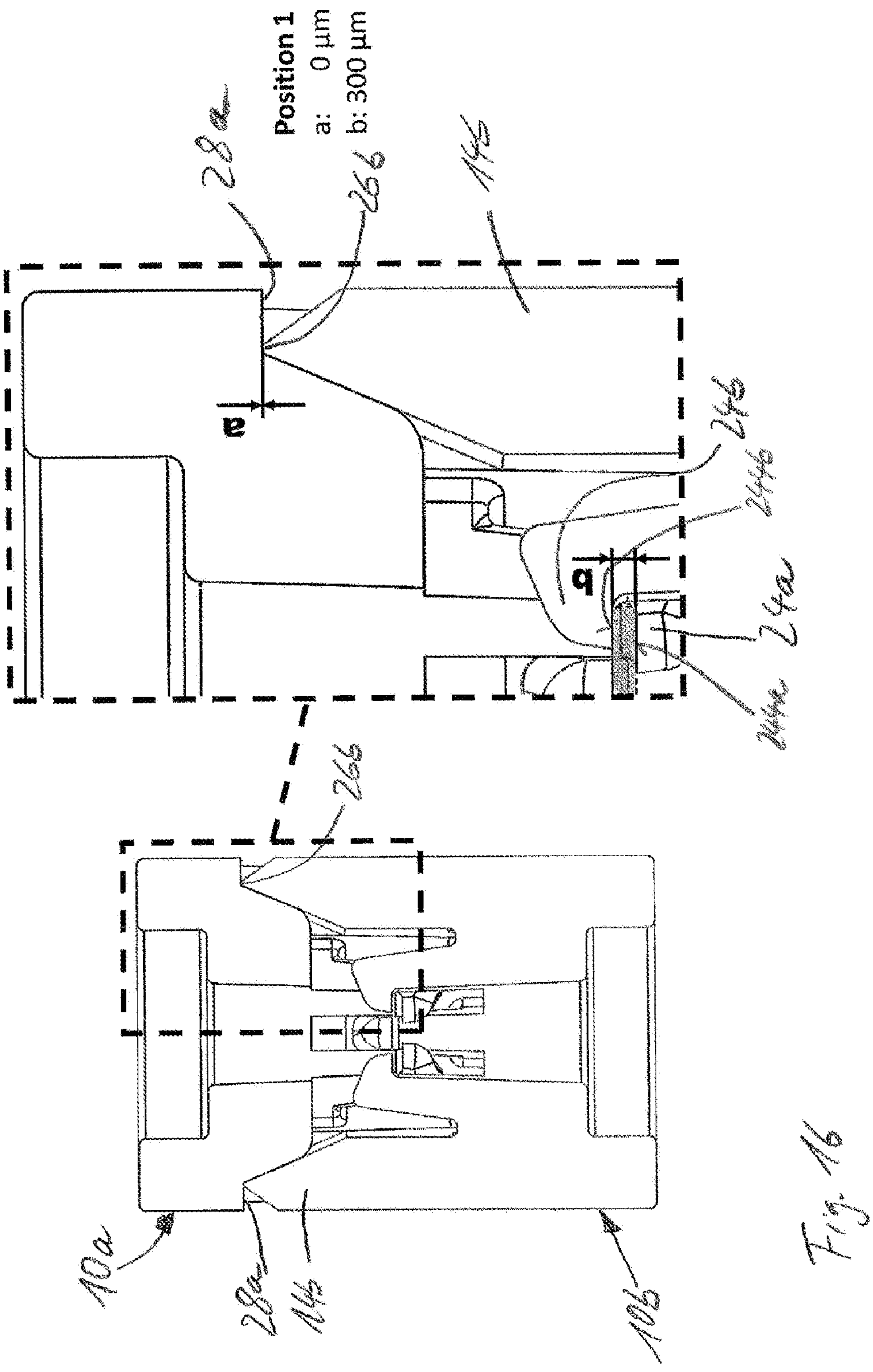
FIG. 16 shows a sectional view and an enlarged detail of the anchor according to the invention when the two anchor parts are in the first end position relative to one another.

The illustration in FIG. 16 shows the anchor of FIG. 14 in the first end position. As has already been explained with reference to FIG. 14, the free ends 26*b* of the fingers 14*b* of the second anchor part rest against the stop surfaces 28*a* of the first anchor part 10*a* and thereby define the first end position. The fact that the free ends 26*a* of the fingers 14*a* of the first anchor part 10*a* rest against the stop surfaces 28*b* of the second anchor part 10*b* in the same way is concealed in FIG. 16 since the two anchor parts 10*a*, 10*b* are of course of identical design.

The detail enlargement on the right in FIG. 16 shows that a clearance a between the free end of a finger 14*b* and the stop surface 28*a* is equal to zero.

In contrast, a clearance b between the latching surface 244*b* of the latching nose 24*b* and the latching surface 244*a* of the latching nose 24*a* is greater than zero. This clearance b can be 300 μm, for example. The clearance b should be at least as large as twice the amplitude of an ultrasonic sonotrode by means of which ultrasonic vibration is applied to the two anchor parts 10*a*, 10*b*, thus enabling the vibration of the sonotrode to be used efficiently to produce frictional energy between the anchor parts 10*a*, 10*b*. Tests have shown that it is particularly advantageous if the size of the selected clearance b is three times the amplitude of the sonotrode. A clearance b of 300 μm would therefore be particularly advantageous in the case of an amplitude of the sonotrode of 100 μm.

Figure 17:
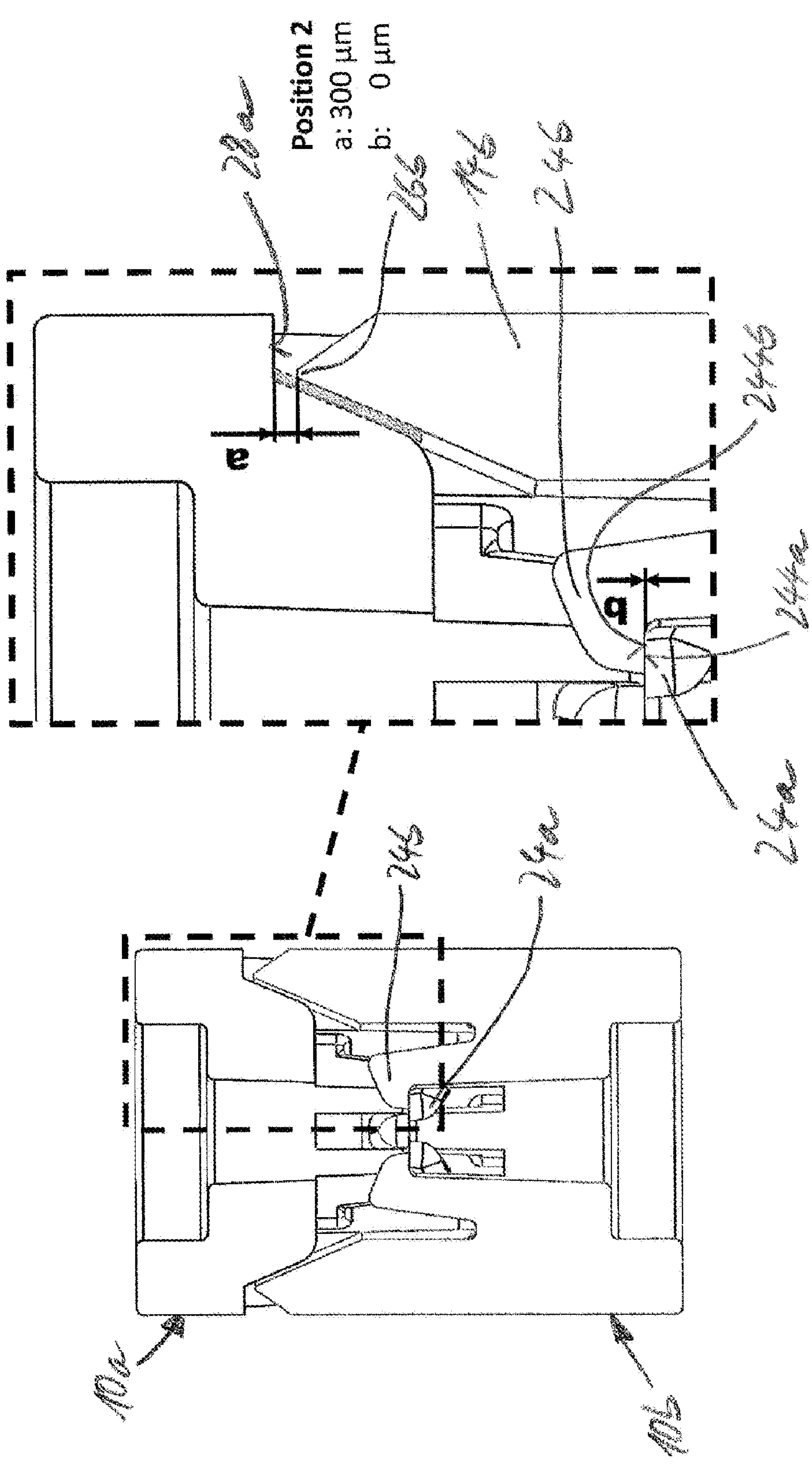
FIG. 17 shows a sectional view and an enlarged detail of the anchor according to the invention when the two anchor parts are in the second end position relative to one another.

FIG. 17 shows the two anchor parts 10*a*, 10*b* in the second end position, in which therefore the latching surfaces 244*b*, 244*a* of the latching noses 24*b* and 24*a* rest against one another. A further movement of the two anchor parts 10*a*, 10*b* away from one another is thereby blocked.

As can be seen on the right in the enlarged detail in FIG. 17, the clearance b between the latching surfaces 244*b* of the latching noses 24*b* and the latching surfaces 244*a* of the latching noses 24*a* is zero in this second end position. In contrast, a clearance between the roof edge that marks the free end 26*b* of the fingers 14*b* and the stop surface 28*a* is a and, in the embodiment illustrated, is 300 μm.

The two anchor parts 10*a*, 10*b* can be moved relative to one another only between the two end positions illustrated in FIG. 16 and FIG. 17. In the embodiment illustrated in FIGS. 16 and 17, the travel between the two end positions is therefore 300 μm.

FIG. 18 contains conceptual explanations and definitions of concepts that serve to explain FIGS. 19 to 22. According to the invention, a selected travel z between the first end position and the second end position of the anchor parts relative to one another is greater than or equal to three times the maximum value $A_{OB1}$ of the amplitude of the ultrasonic sonotrode.

Figure 19:
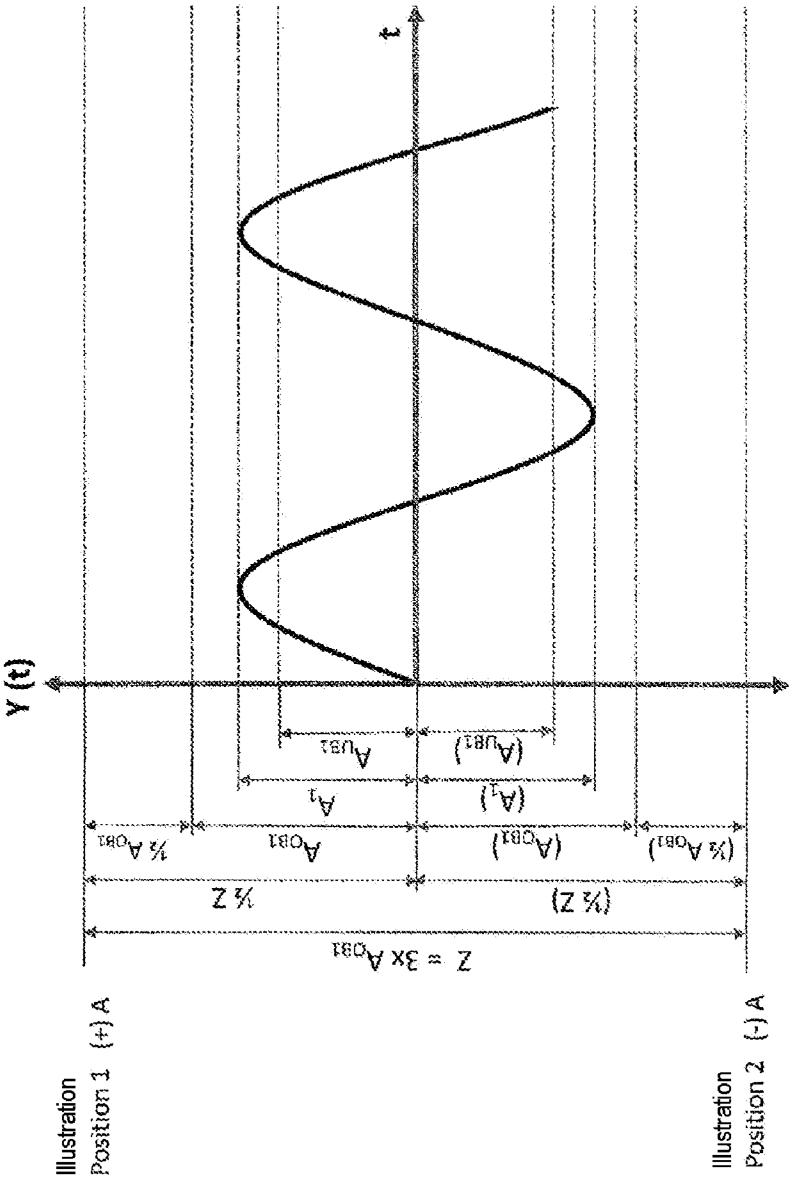
FIG. 19 shows the vibration characteristic of a sonotrode for applying ultrasonic energy to the anchor according to the invention.

FIG. 19 shows schematically and plotted against time a deflection of an ultrasonic sonotrode for acting upon the anchor according to the invention. The deflection follows a sine wave and oscillates between the positive peak value A1 of the amplitude and the negative peak value A1 of the amplitude. This deflection in the form of a sinusoidal oscillation is transferred to the anchor according to the invention in order to introduce ultrasonic energy into the anchor and to heat, plasticize and possibly liquefy the thermoplastic material of the anchor parts 10*a*, 10*b* at the contact points of the two anchor parts 10*a*, 10*b* with one another, at the contact points of the first anchor part 10*a* with the lightweight building board and/or at the contact points of the second anchor part 10*b* with the lightweight building board. The thermoplastic material may then penetrate into the material of the lightweight building board and thereby bring about a materially bonded and/or positive connection between the anchor according to the invention and the lightweight building board and/or between the two anchor parts 10*a*, 10*b*. Ultimately, secure anchoring of the anchor according to the invention in the lightweight building board is thereby achieved. The dimensioning of the travel z, which is particularly advantageous according to the invention, is also plotted in FIG. 19, being three times the maximum value $A_{OB1}$ of the ultrasonic sonotrode.

Figure 20:
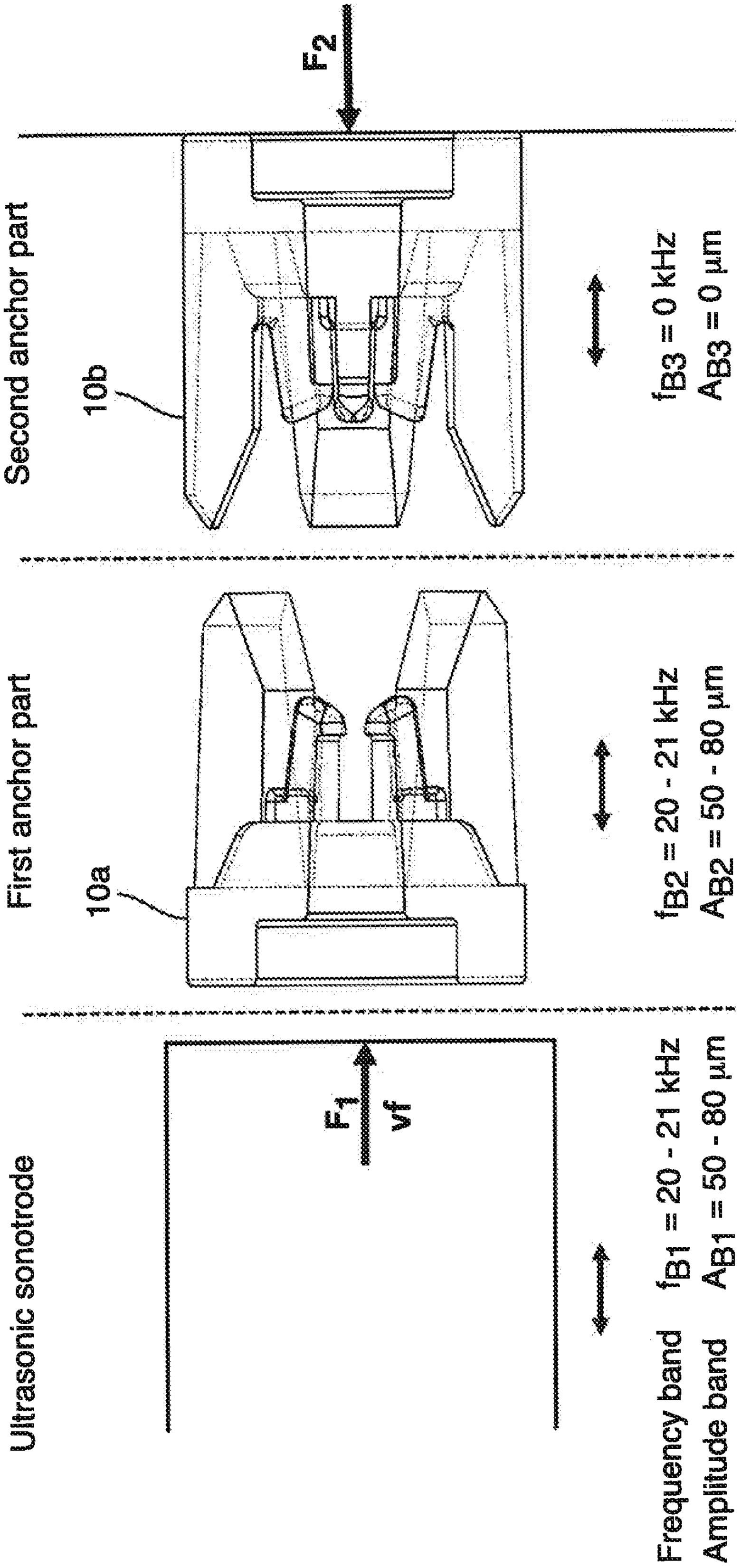
FIG. 20 shows a schematic illustration of an ultrasonic sonotrode, of the first anchor part and of the second anchor part before the assembly of the anchor parts.

FIG. 20 shows a schematic illustration of the ultrasonic sonotrode and of the first anchor part 10*a* and of the second anchor part 10*b* in the state in which they have been pulled apart. In the embodiment illustrated, the ultrasonic sonotrode vibrates at a frequency which is in a frequency band of between 20 and 21 kHz. A peak amplitude of the vibration of the ultrasonic sonotrode is in an amplitude band of between 50 μm and 80 μm.

If the ultrasonic sonotrode were to touch the first anchor part 10*a*, the first anchor part 10*a* would likewise vibrate at a frequency in a frequency band of between 20 kHz and 21 kHz, and the peak amplitude of the vibration of the first anchor part 10*a* would likewise be in an amplitude band of between 50 μm and 80 μm since—by way of simplification—it is assumed that the transfer of the vibration from the ultrasonic sonotrode to the first anchor part 10*a* takes place without losses.

In contrast, the second anchor 10*b* rests by means of its underside, which is illustrated on the right in FIG. 20, either on a counter holder or on the bottom of a blind hole in the lightweight building board, wherein the lightweight building board, in turn, is arranged on a rigid support. The second anchor part 10*b* would thus not vibrate.

Figure 21:
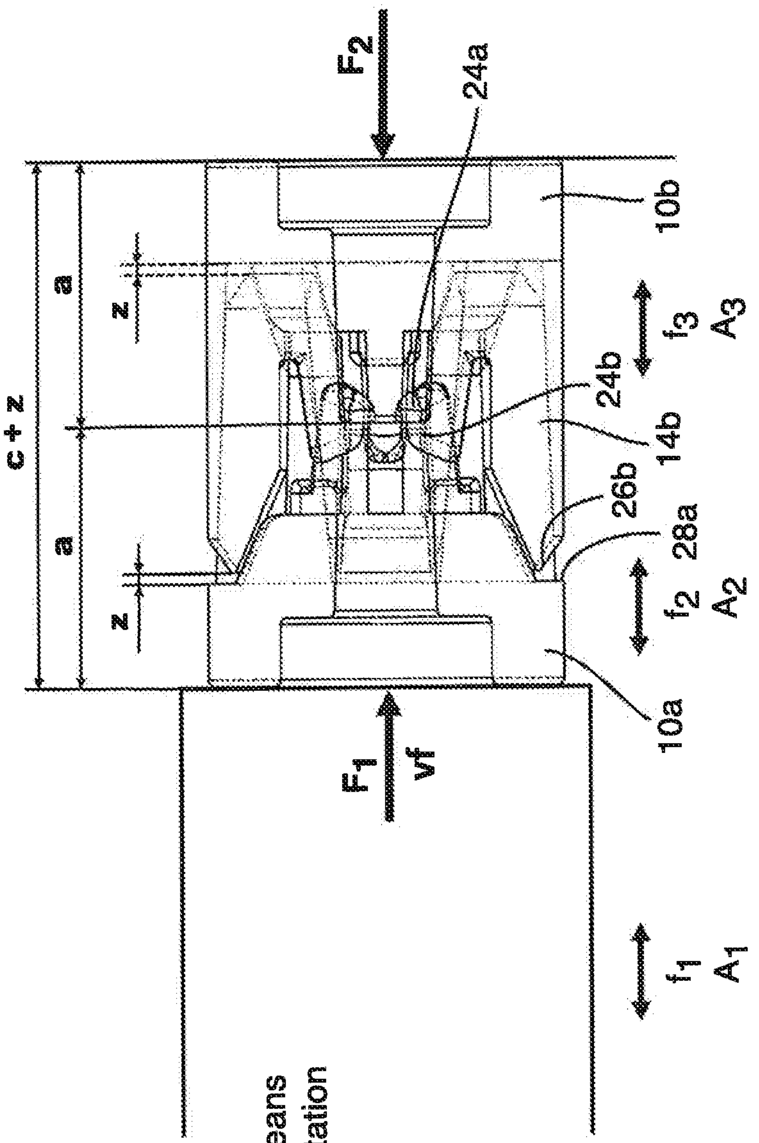
FIG. 21 shows a schematic illustration of the ultrasonic sonotrode, of the first anchor part and of the second anchor part in the assembled state when the two anchor parts are in the second end position relative to one another.

FIG. 21 shows the two anchor parts 10*a*, 10*b* in the fully assembled state and in the second end position. The free ends 26*b* of the fingers 14*b* of the second anchor part 10*b* are arranged at a distance from the stop surfaces 28*a* of the first anchor part 10*a*. The latching surfaces of the latching noses 24*b* rest against the latching surfaces of the latching noses 24*a*.

Figure 22:
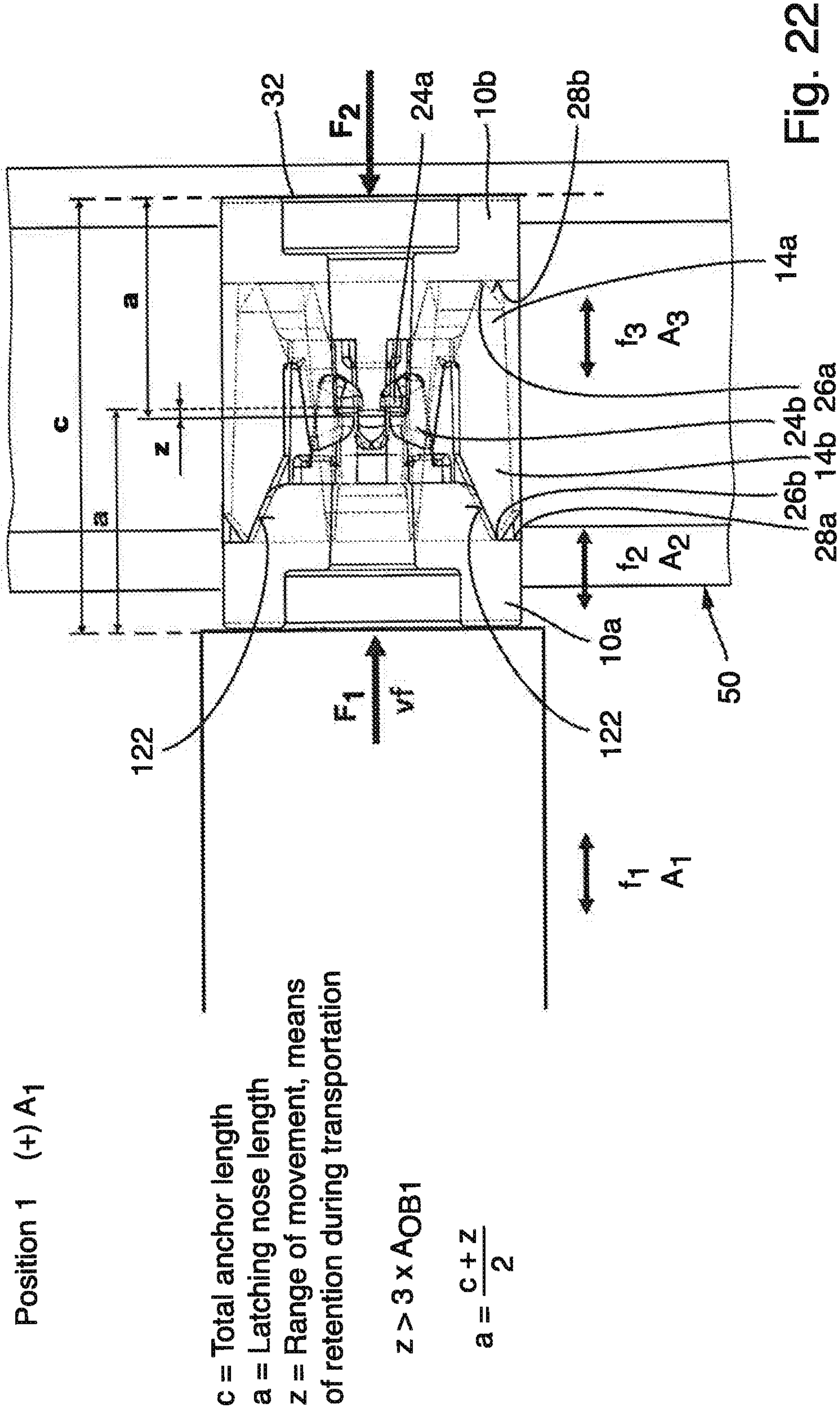
FIG. 22 shows a schematic illustration of the ultrasonic sonotrode, of the first anchor part and of the second anchor part when the two anchor parts are in the first end position relative to one another.

FIG. 22 shows the two anchor parts 10*a*, 10*b*, which, starting from the state illustrated in FIG. 21, are now arranged in the first end position relative to each other. In this first end position, the free ends 26*b* of the fingers 14*b* of the second anchor part 10*b* rest against the stop surfaces 28*a* of the first anchor part 10*a*. At the same time, as illustrated in dashed lines in FIG. 22, the free ends 26*a* of the fingers 14*a* of the first anchor part 10*a* rest against the stop surfaces 28*b* of the second anchor part 10*b*. The latching surfaces of the latching noses 24*b* are spaced apart from the latching surfaces of the latching noses 24*a*.

FIG. 22 also shows that the anchor has been pushed into a preprepared blind hole in a lightweight building board 50, with the result that the second anchor part 10*b* rests by means of the upper side, illustrated on the right in FIG. 22, of the base part on the bottom 32 of the blind hole in the lightweight building board 50. In the embodiment illustrated, the bottom 32 of the blind hole is arranged within the lower covering layer of the lightweight building board. Within the scope of the invention, however, it is also possible for the bottom 32 of the blind hole to be arranged within the core layer, on the surface of the covering layer or, as illustrated in FIG. 22, within the covering layer.

Starting from the state illustrated in FIG. 22, the ultrasonic sonotrode is pressed towards the bottom 32 of the blind hole in the lightweight building board with a force F1. The lightweight building board is held in the illustrated position by means of a counter force F2. The ultrasonic vibration of the ultrasonic sonotrode is thus transferred to the first anchor part 10*a*, whereas the second anchor part 10*b* remains substantially at rest since, of course, it is resting against the bottom 32 of the lightweight building board. In the region of the free ends 26*b* of the fingers 14*b* and of the stop surfaces 28*a* as well as at the free ends 26*a* of the fingers 14*a* and in the region of the stop surfaces 28*b*, there is thus intense heating of the thermoplastic material of which at least the fingers 14*a*, 14*b* of the anchor parts 10*a*, 10*b* are composed. The free ends 26*a*, 26*b* of the fingers 14*a*, 14*b* are thus intensively heated, indeed more intensively than the stop surfaces 28*a*, 28*b*, since the volume of the free ends 26*a*, 26*b* of the fingers 14*a*, 14*b* is less than that volume of the base part of the anchor parts 10*a*, 10*b* which lies behind the stop surfaces 28*a*, 28*b*. As a consequence, it is primarily the free ends of the fingers 14*a*, 14*b* which are melted and consequently the first anchor part 10*a* can be pushed in the direction of the bottom 32 of the blind hole in the lightweight building board 50 at the feed VF of the ultrasonic sonotrode. Consequently, the melting material at the free ends of the fingers 14*a*, 14*b* will yield radially outwards and will spread out to a certain extent into the core layer of the lightweight building board. This is also explained by the fact that the radially inner sloping surfaces of the fingers 14*a*, 14*b* rest against sloping surfaces 122 on the base parts of the anchor parts 10*a*, 10*b*, and the fingers 14*a*, 14*b* are thus pushed radially outwards in the region of their free ends 26*a*, 26*b* as the anchor parts 10*a*, 10*b* are moved towards one another. The anchor 1 according to the invention is thereby also spread apart in the core layer of the lightweight building board 50. Once the first anchor part 10*a* has been pushed in the direction of the bottom 32 of the blind hole in the lightweight building board 50 until the upper side, illustrated on the left in FIG. 22, of the first anchor part 10*a* is flush with the upper side, illustrated on the left in FIG. 22, of the left-hand covering layer of the lightweight building board 50, the feed VF of the ultrasonic sonotrode is stopped, and the introduction of ultrasonic energy is also stopped. As a consequence, the softened or liquefied material of the anchor parts 10*a*, 10*b* will cool down and consequently also solidify. After complete cooling, the two anchor parts 10*a*, 10*b* are thereby connected by material bonding and/or positively to one another and, above all, the two anchor parts 10*a*, 10*b* are also connected by material bonding and/or positively to the lightweight building board 50.

In the embodiment illustrated, the depth of the blind hole and the dimensions of the two anchor parts 10*a*, 10*b* are chosen so that the liquefied material of the free ends of the fingers 14*a*, 14*b* emerges primarily in the region of the core layer of the lightweight building board 50. In the embodiment illustrated, anchoring of the anchor 1 thus takes place primarily in the region of the core layer. This may be advantageous if, for example, the two covering layers of the lightweight building board 50 are very thin or also if they are composed of a nonporous material.

In particular, the anchor 1 according to the invention is extremely advantageous in the case of lightweight building boards 50 with pressure-sensitive or temperature-sensitive covering layers. This is because the heating of the two anchor parts 10*a*, 10*b* takes place primarily in the region of the free ends 26*a*, 26*b* of the fingers 14*a*, 14*b* and thus at a distance from the outer side, illustrated on the right in FIG. 22, of the covering layer situated on the right in FIG. 22. As a consequence, this covering layer is heated only slightly, and therefore there is no risk of marks after the completion of the fixing process of the anchor 1 according to the invention.

Figure 23:
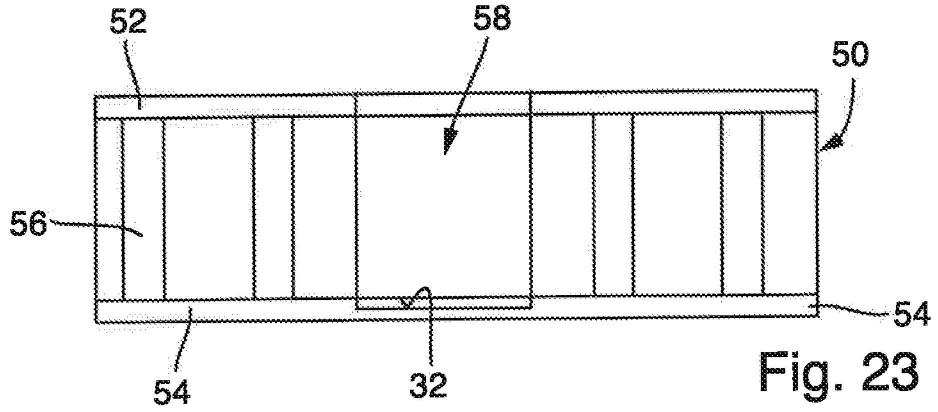
FIG. 23 shows a schematic sectional view of a lightweight building board of an assembly according to the invention after the introduction of a blind hole of a first design.
Figure 24:
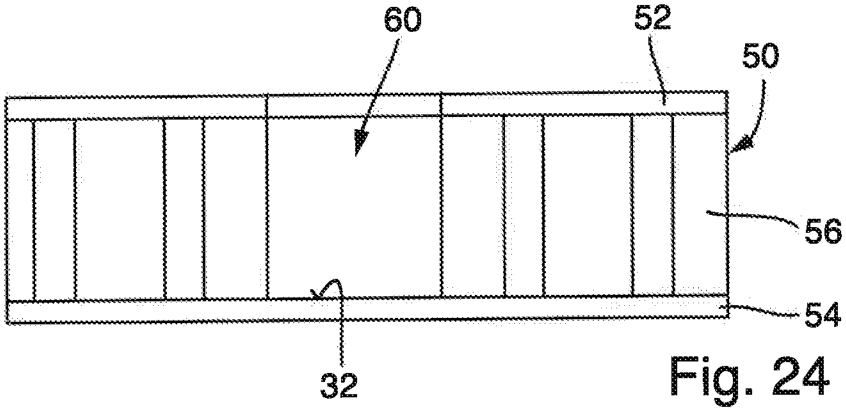
FIG. 24 shows a schematic sectional view of a lightweight building board of an assembly according to the invention after the introduction of a blind hole in accordance with a second design.
Figure 25:
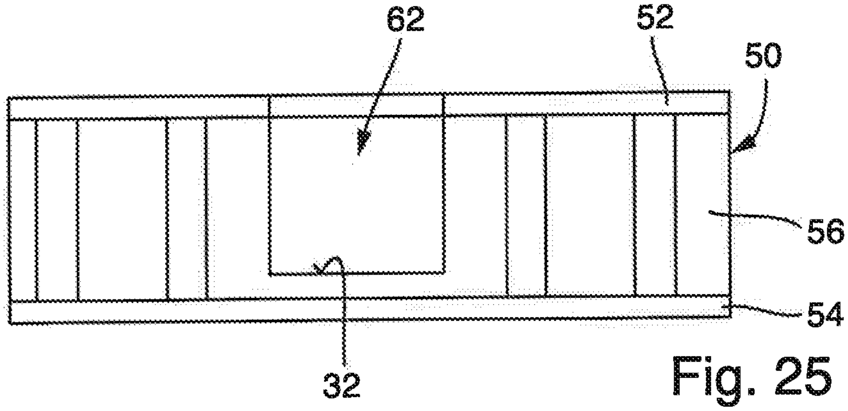
FIG. 25 shows a schematic sectional view of a lightweight building board of an assembly according to the invention after the introduction of a blind hole in accordance with a third design.

FIGS. 23 to 25 show various embodiments of a blind hole in a lightweight building board. FIG. 23 shows a lightweight building board 50 having a first covering layer 52, illustrated at the top in FIG. 23, and a second covering layer 54, illustrated at the bottom in FIG. 23. Arranged between the two covering layers is a core layer 56, which has a lower density than the covering layers 52, 54. By way of example, the core layer 56 is composed of solid wood of low density, e.g. balsa wood. A blind hole 58 for the arrangement of the anchor according to the invention has been introduced into the lightweight building board 50 in such a way that the bottom 32 of the blind hole 58 is approximately halfway through the covering layer 54 illustrated at the bottom in FIG. 23.

FIG. 24 shows the lightweight building board 50 with the two covering layers 52 and 54 and the core layer 56, in which a blind hole 60 has been introduced in such a way that the bottom 32 of the blind hole is arranged on the inner side, situated at the top in FIG. 24, of the lower covering layer 54.

FIG. 25 shows the lightweight building board 50 with a blind hole 62, the bottom 32 of which is still within the core layer 56 and thus above the covering layer 54, which is illustrated at the bottom in FIG. 25.

Figure 26:
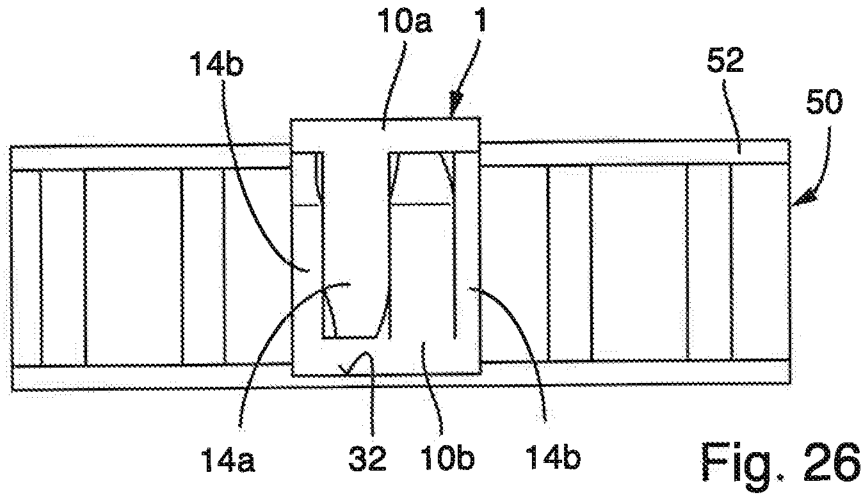
FIG. 26 shows the lightweight building board of FIG. 23 after the insertion of an anchor according to the invention into the blind hole.

FIG. 26 shows a schematic sectional view of the lightweight building board 50, wherein the blind hole has been arranged in accordance with the embodiment illustrated by means of FIG. 23. The anchor 1 according to the invention, having the anchor parts 10*a*, 10*b*, has been introduced into the blind hole until the underside of the second anchor part 10*b*, which is at the bottom in FIG. 26, is resting on the bottom 32 of the blind hole. The upper side of the first anchor part 10*a*, which is illustrated at the top in FIG. 26, is still projecting above the outer side of the covering layer 52 at the top in FIG. 26. The free ends of the fingers 14*b* of the second anchor part 10*b* are resting against the stop surfaces of the first anchor part 10*a*, and the free ends of the fingers 14*a* of the first anchor part 10*a* are resting against the stop surfaces of the second anchor part 10*b*.

Starting from the state illustrated in FIG. 26, cf. also FIG. 22, the first anchor part 10*a* is subjected to ultrasonic energy by means of the ultrasonic sonotrode. The material of the fingers 14*a*, 14*b* liquefies in the region of the respective free ends and enters to a certain extent into the core layer 56 of the lightweight building board 50. At the same time, the anchor parts 10*a*, 10*b* are moved towards one another by pushing the first anchor part 10*a* further into the blind hole. As a result, the fingers 14*a*, 14*b* are spread radially outwards, with the result that the fingers 14*a*, 14*b* are anchored mechanically on the core layer 56. When the upper side of the first anchor part 10*a* is flush with the upper side of the covering layer 52, which is illustrated at the top in FIG. 27, the feed of the sonotrode is stopped, and the application of ultrasonic energy to the first anchor part 10*a* is also stopped. As a consequence, the liquefied material of the anchor parts 10*a*, 10*b* which has penetrated into the core layer 56 cools down and forms solidified regions 64 and 66. As can be seen from FIG. 27, the regions 64 lie below the covering layer 52 but touch the inner side, illustrated at the bottom in FIG. 27, of the covering layer 52. The regions 64 also extend to a certain extent in a radial direction out of the blind hole and into the material of the core layer 56. By means of the regions 64, the anchor according to the invention is thus secured by means of positive engagement with the covering layer 52 at the top in FIG. 27 against being pulled upwards out of the lightweight building board 50. Moreover, the two anchor parts 10*a*, 10*b* are fixed on one another by material bonding. Finally, the anchor according to the invention is also connected by material bonding to the material of the core layer 56 and the underside of the upper covering layer 52.

Figure 27:
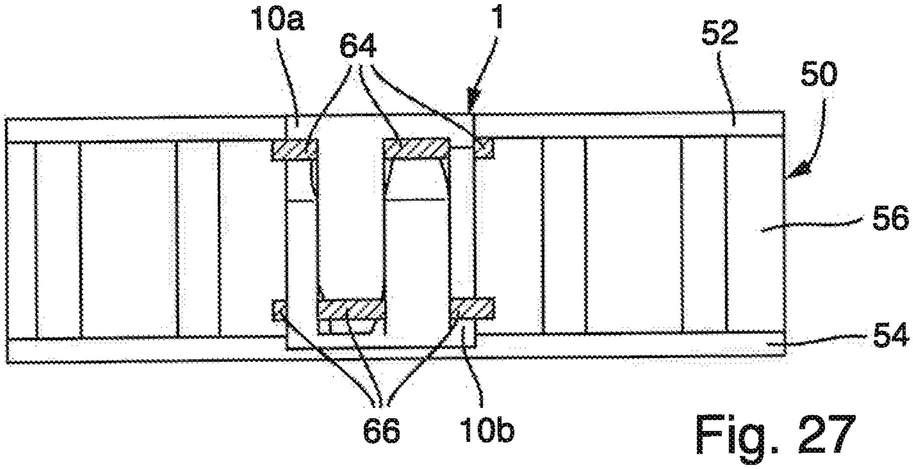
FIG. 27 shows the lightweight building board of FIG. 26 after the fixing of the anchor in the lightweight building board.

The regions 66 are arranged above the upper side of the covering layer 54, which is illustrated at the bottom in FIG. 27. By means of the regions 66, the two anchor parts 10*a*, 10*b* are secured on one another by material bonding. The regions 66 also extend to a certain extent in the radial direction into the material of the core layer 56. By means of the regions 66, the anchor according to the invention is thus secured by material bonding and positively on the core layer 56.

By spreading the fingers 14*a*, 14*b*, the anchor 1 is also secured mechanically on the core layer 56.

It can be seen in FIG. 27 that the regions 66 do not rest against the covering layer 54 at the bottom in FIG. 27. As a consequence, the lower covering layer 54 is heated only slightly during the fixing of the anchor 1 according to the invention. This enables the anchor 1 according to the invention to be inserted in a reliable process even into lightweight building boards 50 with temperature-sensitive and/or pressure-sensitive covering layers 52, 54, without the risk of marks in the region of the anchor 1 according to the invention in the lower covering layer 54.

Figure 28:
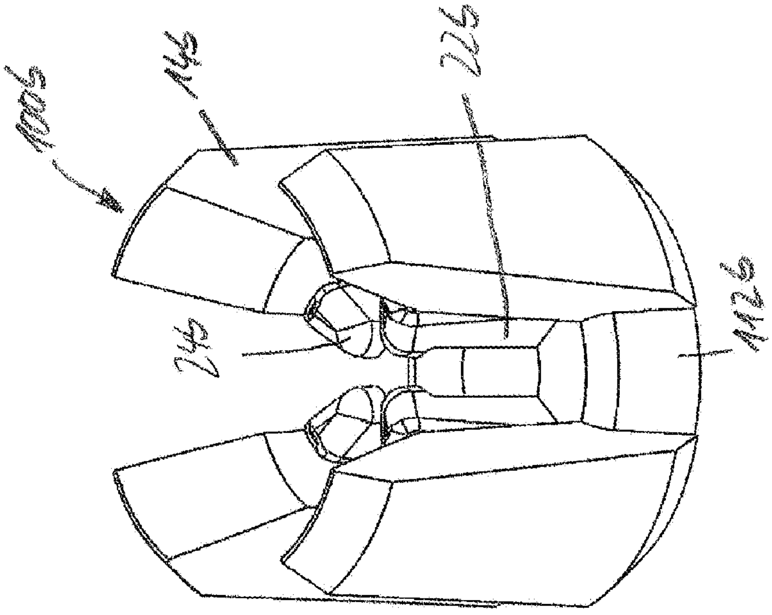
FIG. 28 shows an isometric view of an anchor part in accordance with a second embodiment of the invention obliquely from above, which can form an anchor according to the invention together with the anchor part of FIG. 1.

The illustration in FIG. 28 shows a second anchor part **100*b* according to a second embodiment of the invention. The second anchor part 100*b* is of very similar design to the second anchor part 10*b* of FIG. 2, and therefore only the differences between anchor parts 10*b* and 100*b*** are explained.

In the case of anchor part **100*b*, the base part 112*b* is embodied with a smaller radius. As a consequence, the base part 112*b* does not have any stop surfaces for the free ends of the fingers of a first anchor part. In contrast, the fingers 14*b* and the latching noses 24*b* as well as the latching arms 22*b* of the anchor part 100*b* are of identical design to that in anchor part 10*b*. Anchor part 100*b* is shorter in height than anchor part 10*b*. This has been achieved by virtue of the fact that the ring portion of the base part 12*b*** has been completely omitted.

Figure 29:
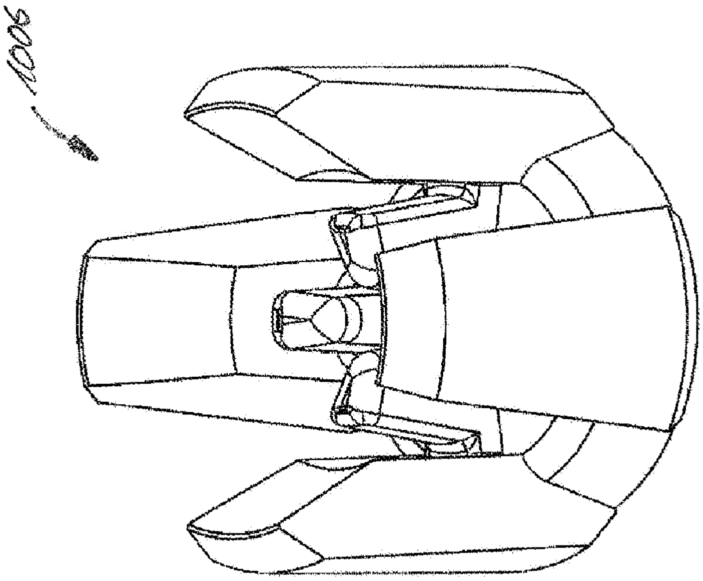
FIG. 29 shows the anchor part of FIG. 28, which has been rotated through 45 around the central longitudinal axis relative to the view in FIG. 28.

FIG. 29 shows the anchor part **100*b* of FIG. 28 in a position rotated by 45° around the central longitudinal axis relative to FIG. 28**.

Figure 30:
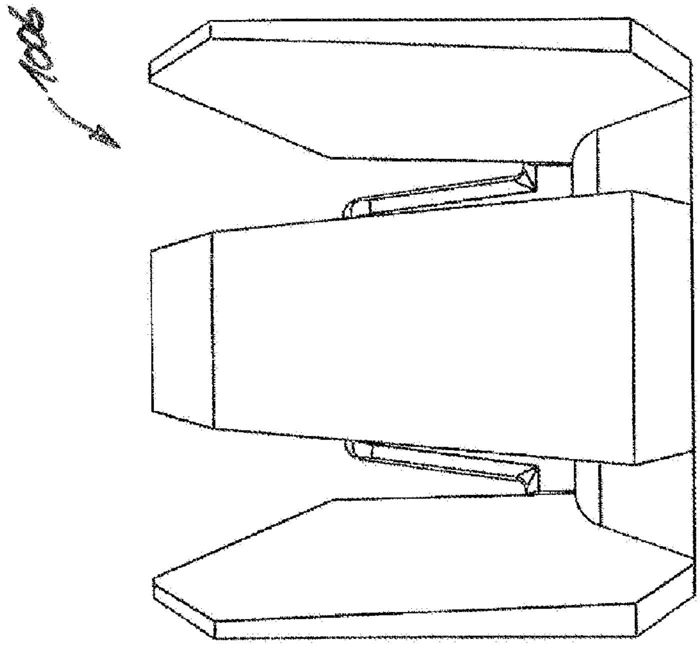
FIG. 30 shows the anchor part of FIG. 28 in a side view.

FIG. 30 shows the anchor part **100*b* of FIG. 28 in a side view. From a comparison of FIGS. 6 and 30, it can be seen that the shorter height of anchor part 100*b* relative to anchor part 10*b* has been achieved by omitting the annular cylindrical portion of the base part 12*b***.

Figure 31:
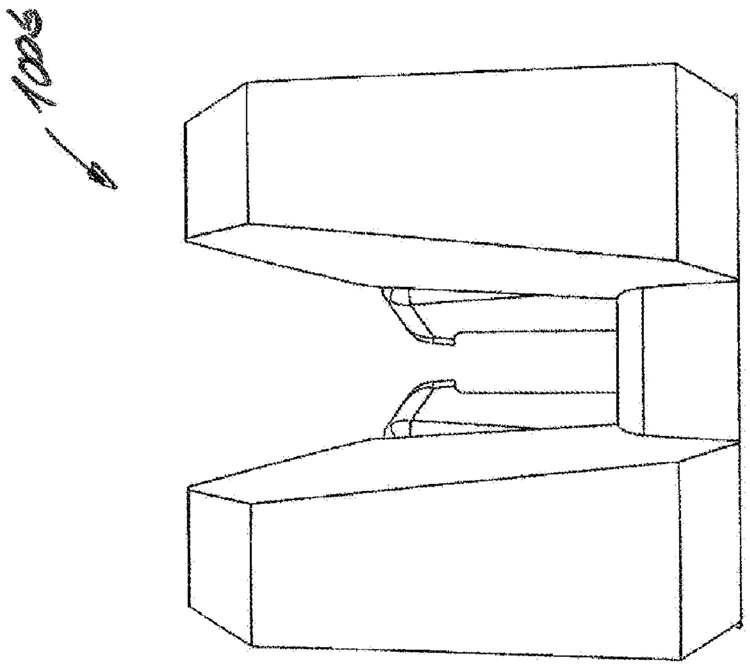
FIG. 31 shows a side view of the anchor part of FIG. 30, which has been rotated through 450 around the central longitudinal axis.

FIG. 31 shows the anchor part **100*b* of FIG. 30 in a position rotated by 45° around the central longitudinal axis 8**.

Figure 32:
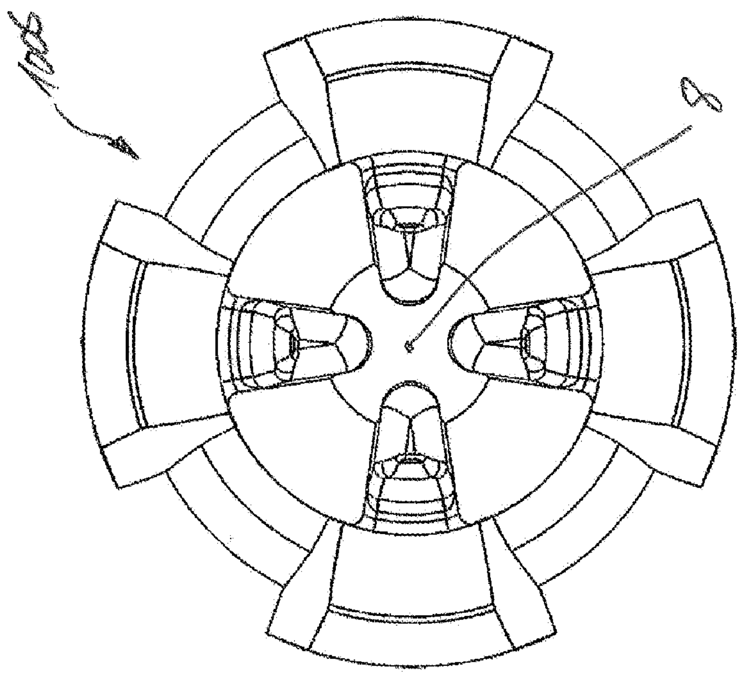
FIG. 32 shows the anchor part of FIG. 28 from above.

FIG. 32 shows the anchor part of FIG. 30 in a view from above.

Figure 33:
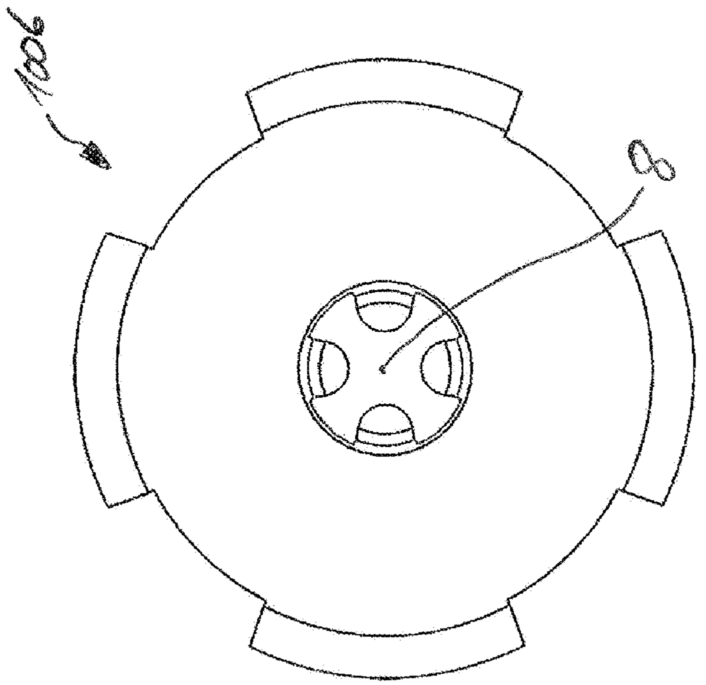
FIG. 33 shows the anchor part of FIG. 28 from below.

FIG. 33 shows the anchor part **100*b* of FIG. 30** in a view from below.

Figure 34:
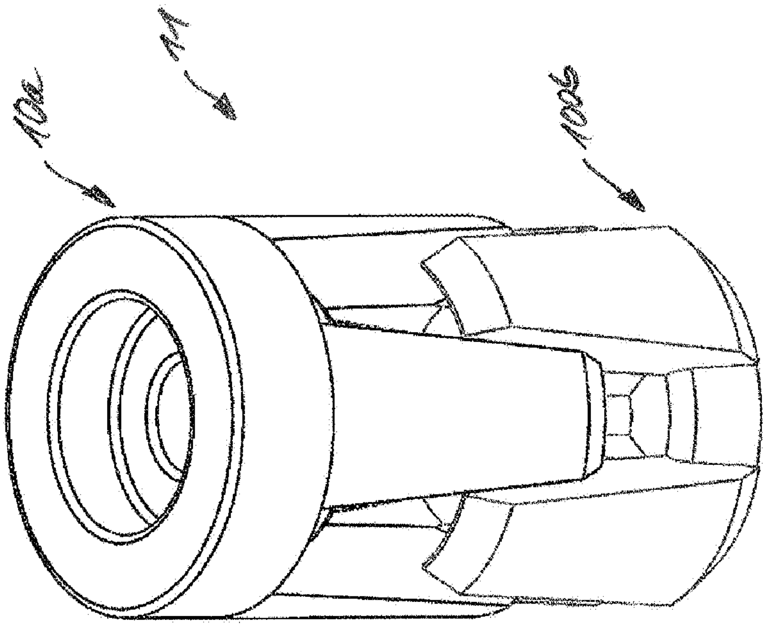
FIG. 34 shows the anchor part of FIG. 1 and the anchor part of FIG. 28 in a view obliquely from above, wherein the two anchor parts have been fitted together to a certain extent.

FIG. 34 shows the first anchor part **10*a* of FIG. 1 in a state in which it has been fitted together partially or to a certain extent and loosely with the second anchor part 100*b* according to FIG. 28. If, starting from the state in FIG. 34, the two anchor parts 10*a*, 100*b* are moved towards one another, the latching noses 24*a*, 24*b* of the two anchor parts 10*a*, 100*b* are initially deflected outwards radially to a certain extent, as has already been explained with reference to the two anchor parts 10*a*, 10*b*. As soon as the latching surfaces of the latching noses 24*a*, 24*b* have been moved past one another, the latching noses 24*a*, 24*b* spring back inwards again. The two anchor parts 10*a*, 100*b* are then in the fully assembled state, which is illustrated in FIG. 35**.

Figure 35:
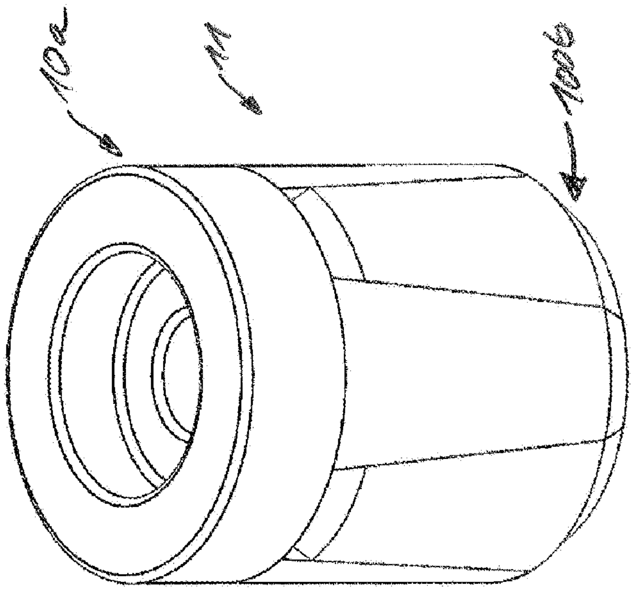
FIG. 35 shows the anchor of FIG. 34 in the fully assembled state.
Figure 36:
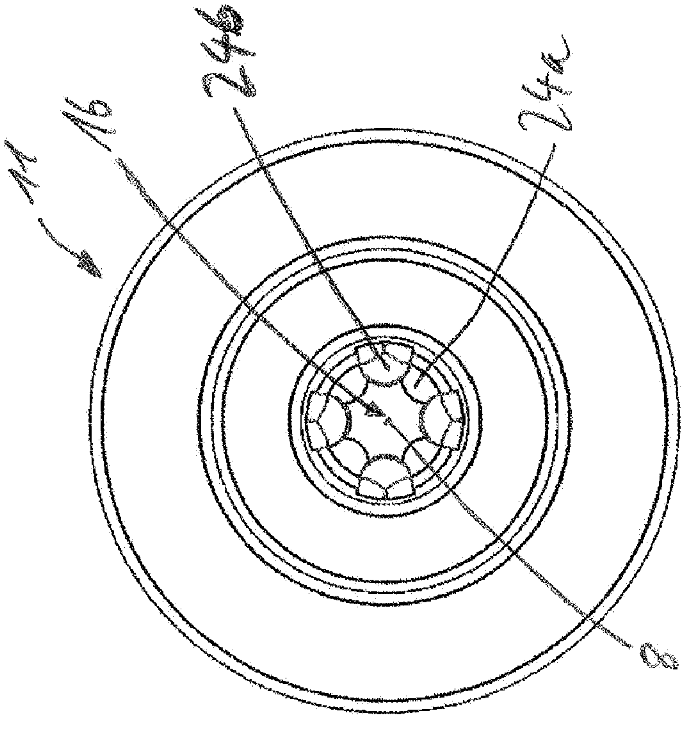
FIG. 36 shows the anchor of FIG. 34 from above.
Figure 37:
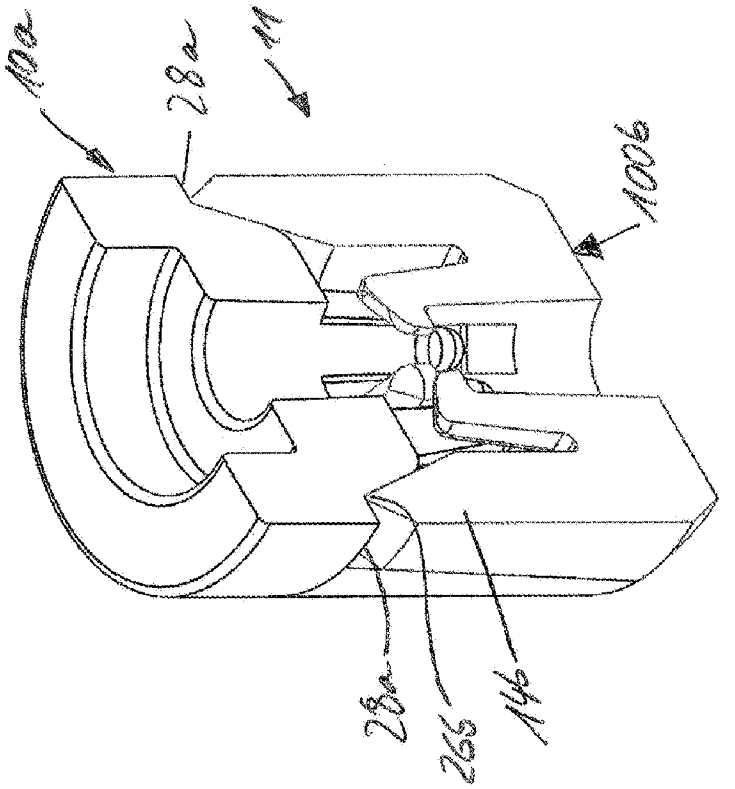

The illustration in FIG. 36 shows the anchor according to the invention as per FIG. 34 in an illustration from above. In FIG. 35, the view is into the screw channel 16 of the anchor, which, as in the case of the anchor parts **10*a*, 10*b*, is partially defined by the radially inner surfaces of the latching noses 24*a*, 24*b* and surrounds the central longitudinal axis 8. The direction of view in FIG. 36 is parallel to the central longitudinal axis 8**.

Figure 37:
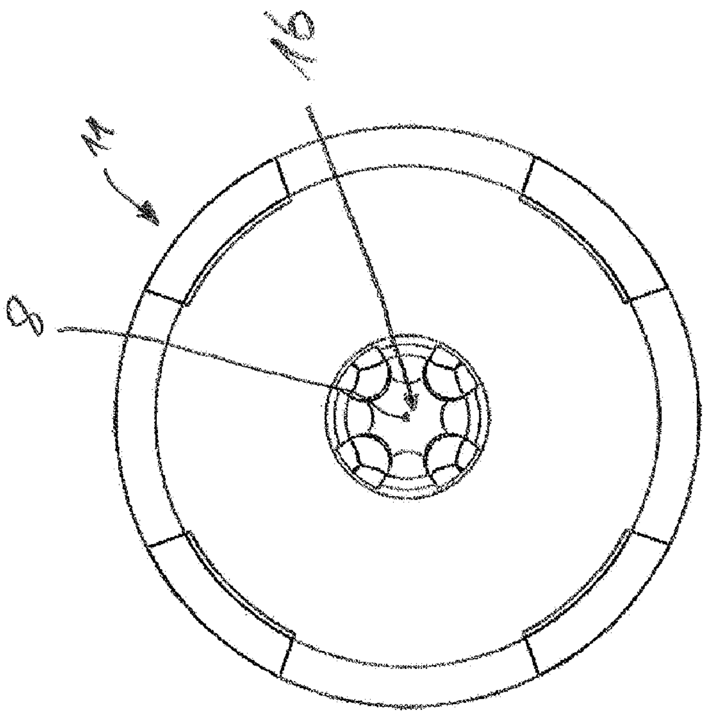
FIG. 37 shows the anchor of FIG. 34 from below.

FIG. 37 shows the anchor of FIG. 35 in an illustration from below. Once again, the view is into the screw channel 16 parallel to the central longitudinal axis 8.

Figure 38:
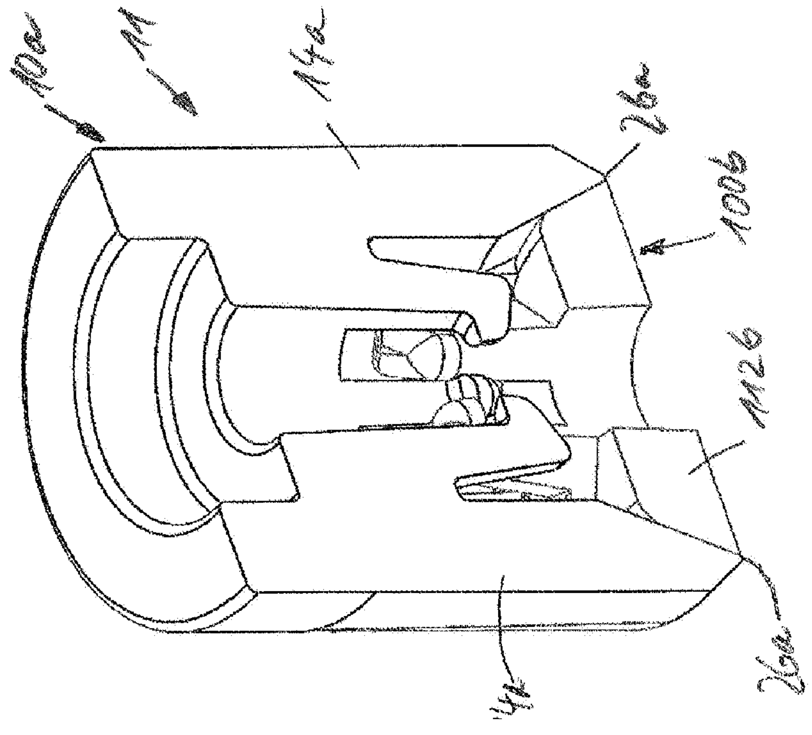
FIG. 38 shows a sectional view of the anchor of FIG. 35 in the first end position of the two anchor parts relative to one another.

FIG. 38 shows the anchor of FIG. 35 in a first sectional view.

In this illustration it can be seen that the free ends **26*a* of the fingers 14*a* of the first anchor part 10*a* are exposed and thus the roof edge of each of the fingers 14*a* is exposed. If the first anchor part 10*a* is pushed in the direction of the second anchor part 100*b* and, at the same time, subjected to ultrasonic energy, the roof edges or free ends 26*a* of the fingers 14*a* rest against the bottom of the blind hole. The material in the region of the free ends of the fingers 14*a* is thereby liquefied and, at the same time, deflected radially outwards by the roof-shaped cross section of the free ends of the fingers 14*a* and the matching external slope of the base part 112*b* of the second anchor part 100*b*. The ultrasonic energy is thus transferred by the free ends of the fingers 14*a*** to the lightweight building board, e.g. to the lower covering layer of the lightweight building board.

FIG. 39 shows the anchor of FIG. 34 in a sectional view, wherein the section plane is different from that in FIG. 37. In this view, it can be seen that the free ends **26*b* of the fingers 14*b* of the second anchor part 100*b* are resting against the stop surfaces 28*a* of the first anchor part 10*a* and thus define the first end position of the two anchor parts 10*a*, 100*b*** relative to one another.

Figure 40:
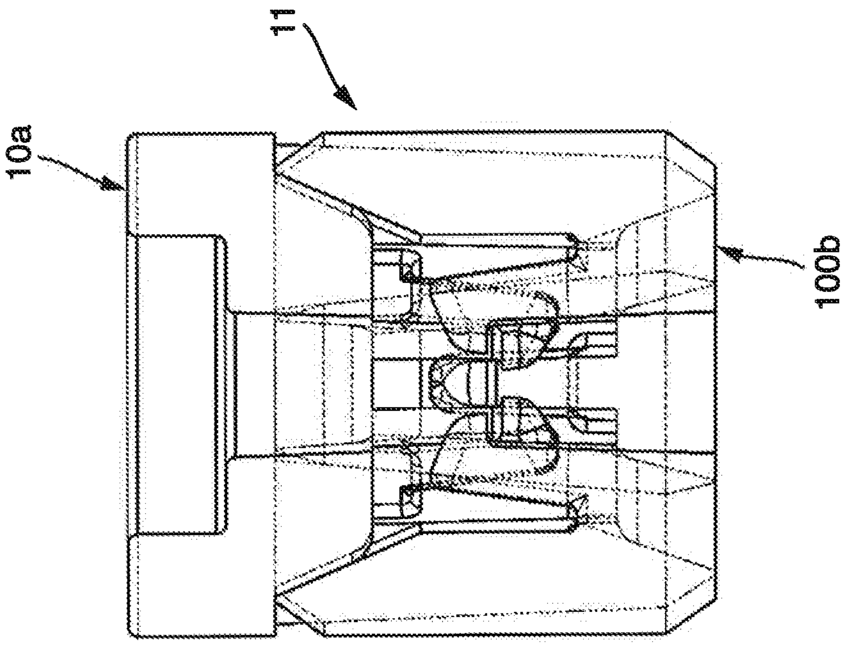
FIG. 40 shows the sectioned anchor in accordance with FIG. 39 from the side.

FIG. 40 shows the sectional view in FIG. 39 from the side.

Figure 41:
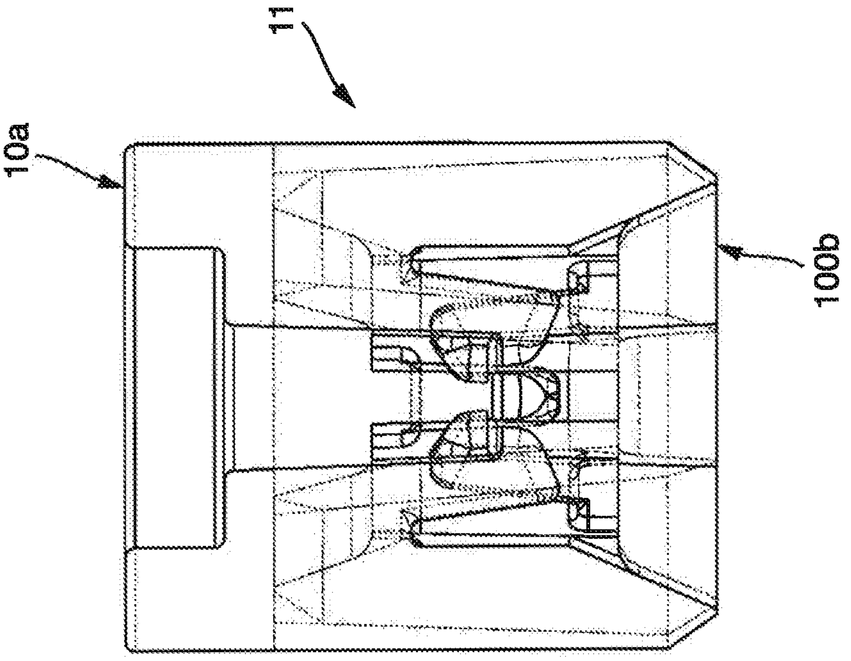
FIG. 41 shows the sectioned anchor in accordance with FIG. 38 from the side.

FIG. 41 shows the sectional view in FIG. 38 from the side.

The invention claimed is:

1. Anchor for arrangement in lightweight building boards, comprising a lightweight building board having a first covering layer and a second covering layer made from compact material that is stiff in compression, and a core layer, which is arranged between the covering layers and is made from material with a low density in comparison with the covering layers, having a first anchor part and a second anchor part, wherein the first and the second anchor part are designed to be movable relative to one another, further wherein a travel (Z) between a first end position and a second end position is limited, wherein the first end position is defined by means of first stop means on the first and the second anchor part, and the second end position is defined by means of second stop means on the first and the second anchor part, wherein the two anchor parts are of identical design to one another.

2. Anchor according to claim 1, wherein the first end position and the second end position define a travel (Z) of between 100 micrometres and 1000 micrometres.

3. Anchor according to claim 1, wherein the first end position and the second end position define a travel (Z) are configured for a ultrasonic sonotrode having a known amplitude which is between twice and four times the known amplitude of the ultrasonic sonotrode.

4. Anchor according to claim 1, wherein the first anchor part and the second anchor part each have at least two fingers extending parallel to a longitudinal direction of the anchor, wherein the fingers of the first anchor part and the fingers of the second anchor part engage at least partially in one another in the assembled state of the first and the second anchor part, and in that the first stop means, which define the first end position, are embodied by means of at least one of the fingers of one of the anchor parts, which rests by its free end against an opposite element of the respective other anchor part.

5. Anchor according to claim 1, wherein the second stop means, which define the second end position, are embodied by means of latching elements on the two anchor parts.

6. Anchor according to claim 1, wherein the latching elements have projecting latching noses which project at least partially radially inwards, in the direction of a central longitudinal axis of the anchor part.

7. Anchor according to claim 6, wherein each latching nose is arranged on a latching arm extending substantially parallel to the central longitudinal axis of the anchor part.

8. Anchor according to claim 6, wherein the latching noses have a rounded shape in a direction parallel to the central longitudinal axis of the anchor part.

9. Anchor according to claim 6, wherein the latching noses each have at least one run-on bevel when viewed in a direction perpendicular to the central longitudinal axis.

10. Anchor according to claim 6, wherein at least two latching noses jointly form a section of a screw channel in the anchor.

11. Anchor according to claim 6, wherein two to six latching noses are provided on each anchor part.

12. Anchor according to claim 6, wherein the first anchor part and the second anchor part each have at least two latching arms which extend substantially parallel to the central longitudinal axis of the anchor and at the end of each of which a latching nose extending perpendicularly to the central longitudinal axis is arranged.

13. Anchor according to claim 12, wherein, when the two anchor parts are between the two end positions relative to one another, in each case one latching nose of the first anchor part is arranged between two latching noses of the second anchor part, when viewed in a projection parallel to the central longitudinal axis.

14. Anchor according to claim 6, wherein, in the assembled state of the anchor parts and when the two anchor parts occupy the second end position relative to one another, the latching noses of the first anchor part and the latching noses of the second anchor part rest against one another only in the region of latching surfaces which adjoin the lateral boundaries of the latching noses.

15. Assembly having at least one anchor according to claim 1 and a lightweight building board.

16. Assembly according to claim 15 with an ultrasonic sonotrode for applying ultrasound to the anchor.

17. Anchor for arrangement in lightweight building boards, comprising a lightweight building board having a first covering layer and a second covering layer made from compact material that is stiff in compression, and a core layer, which is arranged between the covering layers and is made from material with a low density in comparison with the covering layers, having a first anchor part and a second anchor part, wherein the first and the second anchor part are designed to be movable relative to one another, further wherein a travel (Z) between a first end position and a second end position is limited, wherein the first end position is defined by means of first stop means on the first and the second anchor part, and the second end position is defined by means of second stop means on the first and the second anchor part, further wherein the latching elements have projecting latching noses which project at least partially radially inwards, in the direction of a central longitudinal axis of the anchor part, wherein the latching noses have a rounded shape in a direction parallel to the central longitudinal axis of the anchor part.

18. Anchor for arrangement in lightweight building boards, comprising a lightweight building board having a first covering layer and a second covering layer made from compact material that is stiff in compression, and a core layer, which is arranged between the covering layers and is made from material with a low density in comparison with the covering layers, having a first anchor part and a second anchor part, wherein the first and the second anchor part are designed to be movable relative to one another, further wherein a travel (Z) between a first end position and a second end position is limited, wherein the first end position is defined by means of first stop means on the first and the second anchor part, and the second end position is defined by means of second stop means on the first and the second anchor part, further wherein the latching elements have projecting latching noses which project at least partially radially inwards, in the direction of a central longitudinal axis of the anchor part, further wherein the first anchor part and the second anchor part each have at least two latching arms which extend substantially parallel to the central longitudinal axis of the anchor and at the end of each of which a latching nose extending perpendicularly to the central longitudinal axis is arranged, and further wherein, when the two anchor parts are between the two end positions relative to one another, in each case one latching nose of the first anchor part is arranged between two latching noses of the second anchor part, when viewed in a projection parallel to the central longitudinal axis.

* * * * *